(12) United States Patent
Yamada et al.

(10) Patent No.: US 12,109,823 B2
(45) Date of Patent: Oct. 8, 2024

(54) IMAGE-FORMING APPARATUS

(71) Applicant: SHARP KABUSHIKI KAISHA, Sakai (JP)

(72) Inventors: Nobuyasu Yamada, Sakai (JP); Kaoru Ishikura, Sakai (JP); Atsushi Ogo, Sakai (JP); Shinji Katoh, Sakai (JP); Naoki Hasegawa, Sakai (JP); Yuichi Kaku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 140 days.

(21) Appl. No.: 17/943,510

(22) Filed: Sep. 13, 2022

(65) Prior Publication Data

US 2023/0080629 A1    Mar. 16, 2023

(30) Foreign Application Priority Data

Sep. 16, 2021   (JP) ................................. 2021-151375

(51) Int. Cl.
  *B41J 2/38*     (2006.01)
  *B41J 29/377*   (2006.01)
(52) U.S. Cl.
  CPC .............. *B41J 2/38* (2013.01); *B41J 29/377* (2013.01)

(58) Field of Classification Search
  CPC .......... G03G 2215/00717; G03G 2215/00772; G03G 2215/0078; B41J 2/38; B41J 29/377
  See application file for complete search history.

(56) References Cited

FOREIGN PATENT DOCUMENTS

| JP | 11109838 A | * | 4/1999 |
| JP | H11-109838 A | | 4/1999 |

* cited by examiner

*Primary Examiner* — Jason S Uhlenhake
(74) *Attorney, Agent, or Firm* — ScienBiziP, P.C.

(57) ABSTRACT

An image-forming apparatus includes a condensation determiner that determines whether there is a possibility of condensation occurring inside the image-forming apparatus using condensation determination information including a measured apparatus temperature inside the apparatus, a preparation processor that performs a preparation process for executing a print function, and a preparation waiting time setter that sets a preparation waiting time indicating a period of time for performing the preparation process. When the image-forming apparatus is powered and it is determined that there is a possibility of condensation occurring inside the image-forming apparatus, a preparation waiting time is set using the condensation determination information and the preparation process is started. After counting of the preparation waiting time is started, it is determined that a periodically-measured fusing temperature reached a predetermined target temperature, and thereafter, the counted preparation waiting time elapsed, the preparation process is canceled.

12 Claims, 16 Drawing Sheets

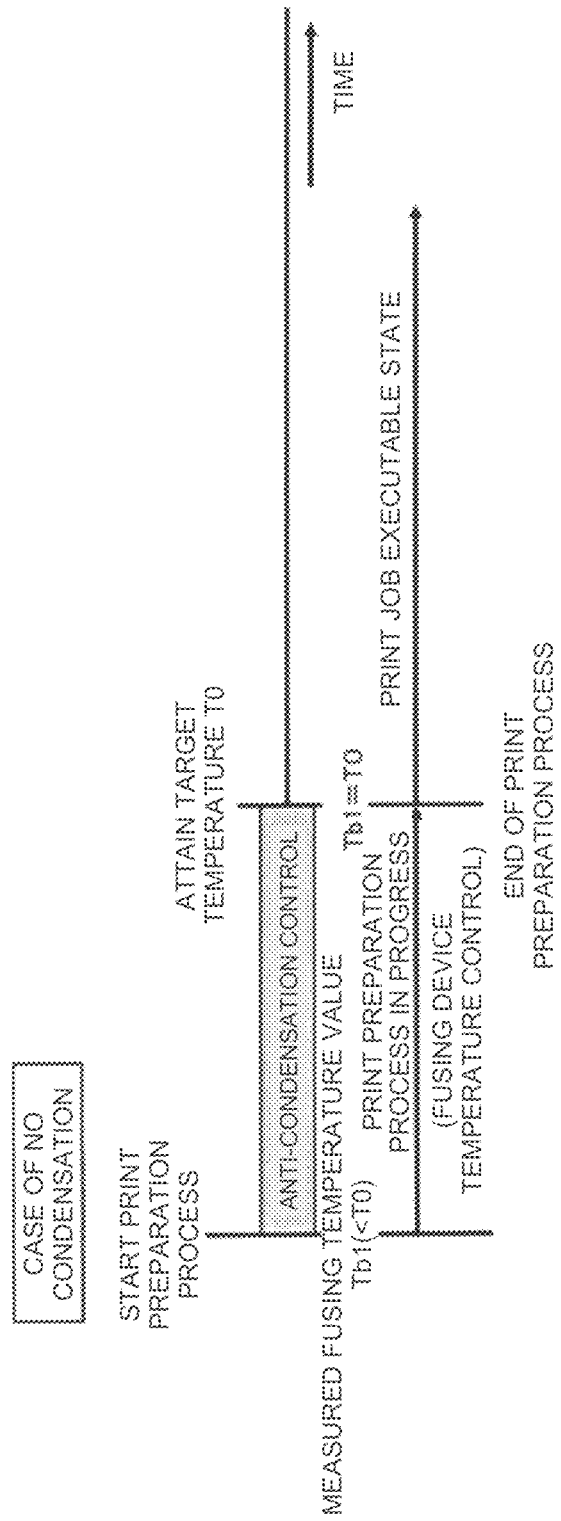

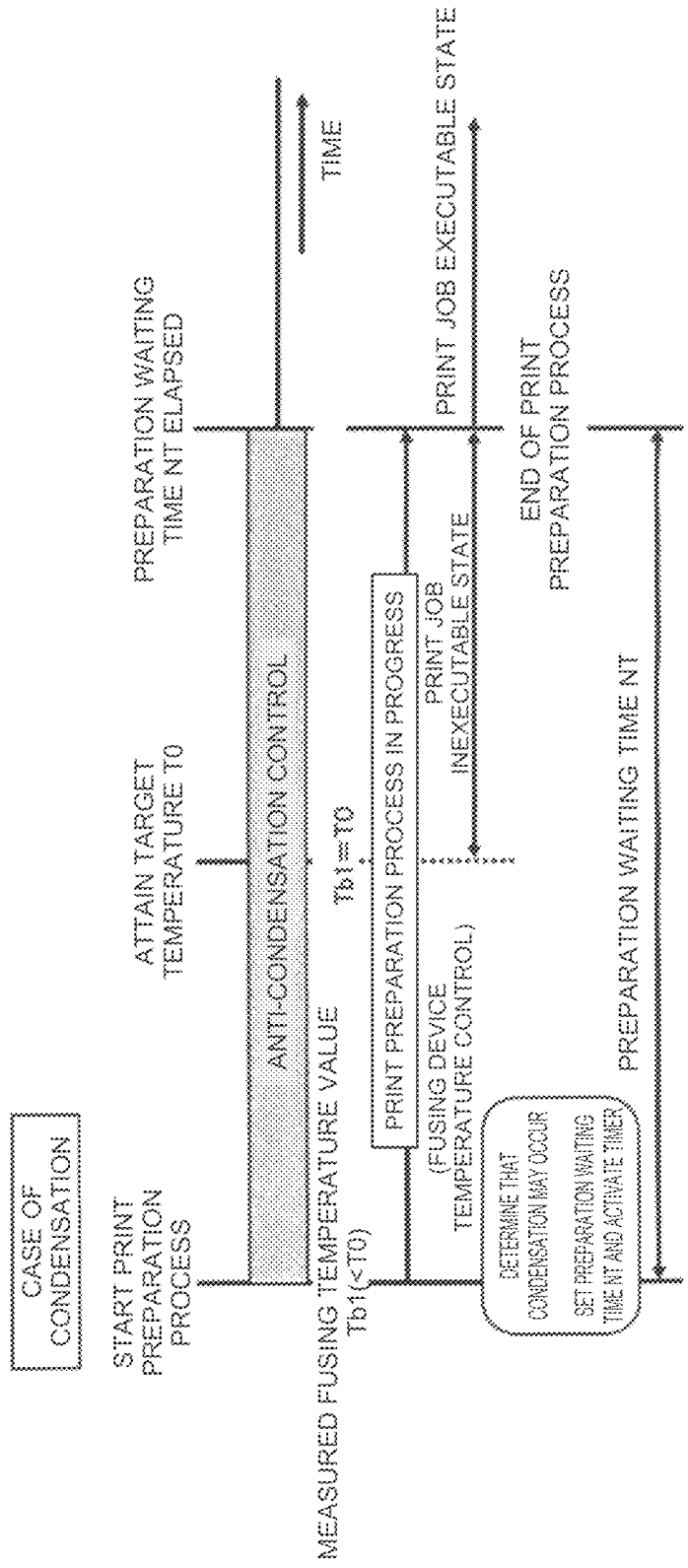

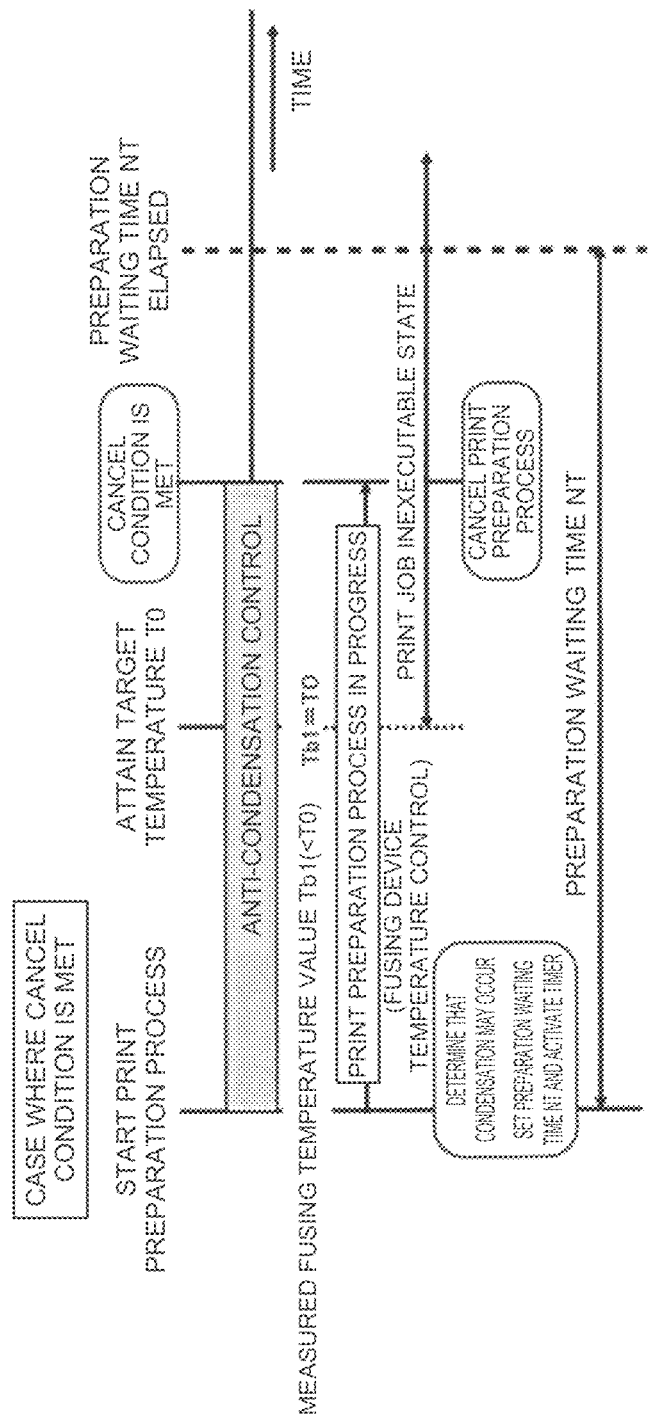

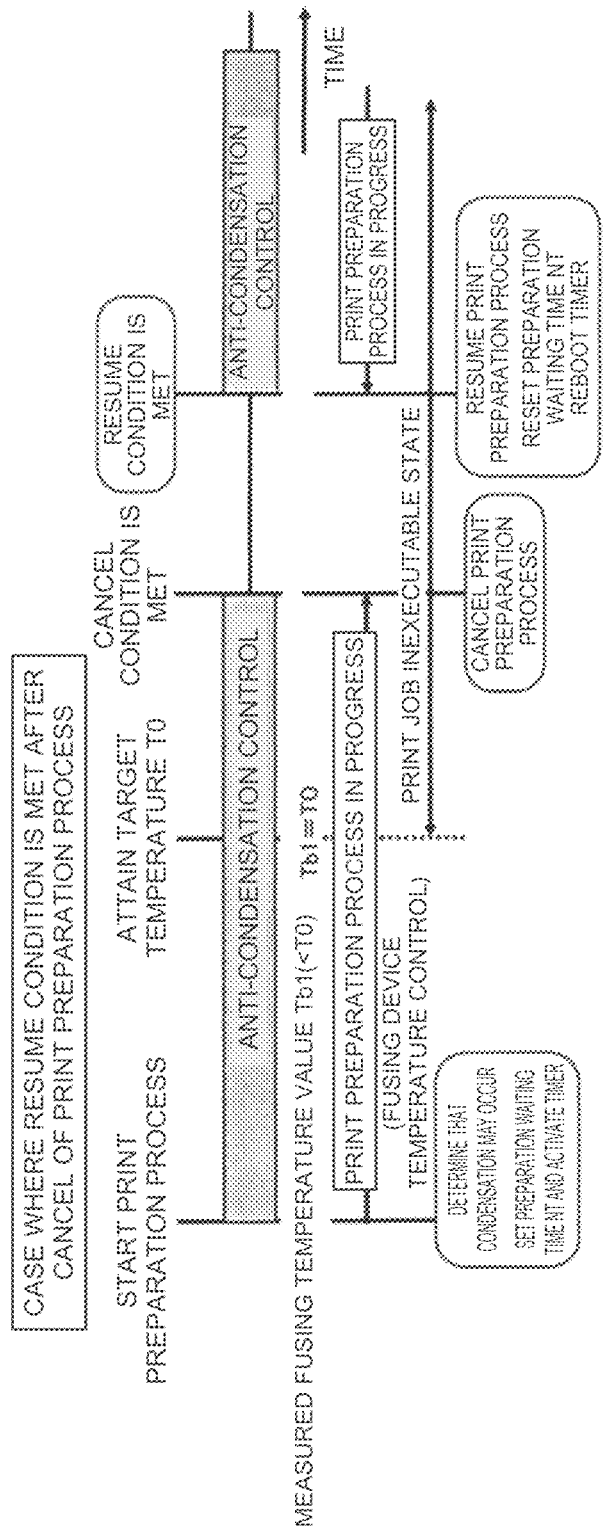

FIG. 9

| 41a | MEASURED APPARATUS TEMPERATURE VALUE | Ta1 | 5 (°C) |
|---|---|---|---|
| 41b | MEASURED FUSING TEMPERATURE VALUE | Tb1 | 5 (°C) |
| 42 | MEASURED MOISTURE VALUE | H1 | 70 (%) |
| 43 | MEASURED POWER SUPPLY INTERRUPTION TIME VALUE | PT | 8 (HOURS) |
| 44 | PREPARATION WAITING TIME | NT | 8 (MINUTES) |
| 48 | TEMPERATURE DETERMINATION VALUE | Th | 10 (°C) |
|  | MOISTURE DETERMINATION VALUE | Hh | 50 (%) |
|  | POWER SUPPLY TIME DETERMINATION VALUE | Ph | 5 (HOURS) |
| 49 | TARGET TEMPERATURE VALUE | T0 | 160 (°C) |
| 50 | EXTENSION REFERENCE TIME | N0 | 4 (MINUTES) |
| 47 | LIFETIME PREFERENTIAL SETTING INFORMATION | INVALID | 0 |
|  |  | VALID | 1 |
| 51 | CONDENSATION DETERMINATION RESULT (KH) | NO POSSIBILITY OF CONDENSATION | 0 |
|  |  | POSSIBILITY OF CONDENSATION | 1 |

CONDENSATION DETERMINATION CONDITION INFORMATION

PRINT REQUEST INFORMATION — 45

| PRINT SIDE | SINGLE-SIDED PRINTING |
|---|---|
| THE NUMBER OF COPIES | 2 |
| COLOR/MONOCHROME | MONOCHROME |
| DOCUMENT SIZE | A4 |
| PRINT SHEET SIZE | A4 |
| PRINT FILE NAME | FL001 |

PRINT PENDING INFORMATION — 46

| PRINT SIDE | DOUBLE-SIDED PRINTING |
|---|---|
| THE NUMBER OF COPIES | 4 |
| COLOR/MONOCHROME | COLOR |
| DOCUMENT SIZE | B5 |
| PRINT SHEET SIZE | B5 |
| PRINT FILE NAME | FL200 |

IMAGE-FORMING APPARATUS

BACKGROUND OF THE INVENTION

Field of the Invention

The present disclosure relates to image-forming apparatuses, and more particularly, to an image-forming apparatus having a function of reducing an adverse effect of condensation.

Description of the Background Art

Image-forming apparatuses have been generally used, and in particular, multifunction peripherals having a document reading (scanning) function, a network connecting function, and the like in addition to a printing function for performing single-sided printing and double-sided printing of documents have been used.

While such an image-forming apparatus is not in use, a photoreceptor and other components required for image formation are at a low temperature. However, when the image-forming apparatus is to be used, a preparation operation (a warm-up operation) is required to raise a temperature inside the image-forming apparatus and around components, such as the photoreceptor, to a predetermined temperature in order to normally operate the components required for image formation.

Normally, a heater of a fusing device is activated to perform the preparation operation, but when the temperature of the photoreceptor or the other components rises rapidly, condensation may occur on the components required for image formation.

For example, when printing is executed with condensation on a surface of the photoreceptor, image quality is degraded.

When double-sided printing is performed, after printing on a first printing side (a front surface), a conveyed sheet may absorb water during a conveyance process of reversing the printed sheet.

Printing on a second printing side (a back surface) of the sheet absorbing water also results in degradation of image quality.

Therefore, measures to prevent condensation have been proposed in general.

For example, as a general technique, the following image-forming apparatus has been disclosed. That is, a temperature inside an image-forming apparatus is measured, and when an initial temperature inside the image-forming apparatus obtained at a time of turning on of a main switch of the image-forming apparatus is lower than a set temperature, the temperature inside the image-forming apparatus is gradually raised to the set temperature within a warm-up time while a heater that raises the temperature inside the image-forming apparatus is switched on and off several times during the warm-up time. Accordingly, the temperature inside the image-forming apparatus does not rapidly rise, and therefore, a condensation phenomenon is suppressed. Furthermore, when the temperature inside the image-forming apparatus does not reach the set temperature within the warm-up time, the warm-up time is extended and an indication that the warm-up time is extended is displayed.

Furthermore, when double-sided printing is performed, after printing is performed on a front surface of a sheet, the sheet is brought into a standby state for a certain period of time or longer in a conveying path where the sheet is reversed to dry before printing on a back surface.

However, although deterioration of image quality caused by a condensation phenomenon can be suppressed by gradually raising a temperature inside the image-forming apparatus to the set temperature as with the case of general image-forming apparatuses, the warm-up time becomes longer and a period of time required before a printing process becomes available is increased.

Even when no condensation actually occurs and only a short warm-up time is required, the period of time before the printing process becomes available is increased without exception.

When the double-sided printing is performed first immediately after the warm-up time has elapsed, condensation may not be sufficiently removed resulting in degradation in image quality.

Furthermore, in the double-sided printing, even when a sheet is brought into a standby state for a certain period of time to be sufficiently dried in the conveying path where the sheet is reversed, the sufficiently-dried sheet is not guaranteed, and in addition, the sheet in the standby state in the conveying path may induce a sheet jam.

Furthermore, the single-sided printing does not require reversing of a sheet unlike the double-sided printing, and therefore, an adverse effect of condensation is expected to be less than in the double-sided printing.

However, a long warm-up time that is constantly set requires a long period of time before a printing process of the single-sided printing becomes available, and therefore, printing efficiency in terms of time is degraded.

Accordingly, the present disclosure is made in view of the above circumstances and provides, in a circumstance where condensation may occur, an image-forming apparatus capable of suppressing degradation in image quality due to condensation when double-sided printing is performed and suppressing degradation in print efficiency in terms of time in addition to deterioration in image quality due to condensation when single-sided printing is performed.

SUMMARY OF THE INVENTION

According to an aspect of the present disclosure, an image-forming apparatus having a printing function, includes an apparatus temperature sensor that measures an apparatus temperature inside the image-forming apparatus, a condensation determiner that determines whether there is a possibility of condensation occurring inside the image-forming apparatus using predetermined condensation determination information including the measured apparatus temperature, a fusing temperature sensor that measures a fusing temperature of a fusing device, a target temperature determiner that determines whether the measured fusing temperature reached a predetermined target temperature, a preparation processor that performs a preparation process for executing the printing function, and a preparation waiting time setter that sets a preparation waiting time indicating a period of time in which the preparation process is performed. When the image-forming apparatus is powered, the apparatus temperature sensor measures a current apparatus temperature. When the condensation determiner determines that there is a possibility of condensation inside the image-forming apparatus, the preparation waiting time setter sets the preparation waiting time using the condensation determination information. The preparation processor starts the preparation process. After counting of the preparation waiting time is started at a start of the preparation process, the fusing temperature sensor periodically measures a current fusing temperature. After the target temperature determiner determines that the periodically-measured fusing temperature reached the predetermined target temperature and when the counted preparation waiting time elapsed, the preparation processor cancels the preparation process.

The image-forming apparatus may further includes a print request checker that determines whether a print request was issued to start the print function. When the condensation determiner determines that there is a possibility of condensation occurring inside the image-forming apparatus, and when the print request checker determines that a print request for single-sided printing of performing printing on one side of a printing sheet was issued, after the target temperature determiner determines that the periodically-measured fusing temperature reached a predetermined target temperature and before the set preparation waiting time elapses, the requested single-sided printing may be executed after the preparation processor cancels the preparation process.

The image-forming apparatus further includes a print request checker that determines whether a print request was issued to start the print function, and a print pending processor that suspends a print job corresponding to the print request. When the condensation determiner determines that there is a possibility of condensation occurring inside the image-forming apparatus, and when the print request checker determines that a print request for double-sided printing of performing printing on both sides of a printing sheet was issued, after the target temperature determiner determines that the periodically-measured fusing temperature reached a predetermined target temperature and before the set preparation waiting time elapses, the print pending processor may suspend a print job of the double-sided printing corresponding to the print request. After the set preparation waiting time elapsed, the preparation processor may cancel the preparation process and the double-sided printing corresponding to the print request is executed.

When the print request checker determines that a print request for single-sided printing was issued in a state in which the print pending processor suspends the print job of the double-sided printing corresponding to the print request, the preparation processor may cancel the preparation process and the single-sided printing corresponding to the print request may be executed before the set preparation waiting time elapses, and thereafter, the pending double-sided printing may be executed.

The image-forming apparatus may further includes a hygrometer that measures a moisture level inside the image-forming apparatus, a power supply interruption timer that measures a power supply interruption time that is a period of time in which the image-forming apparatus is turned off, and a storage that stores condensation determination condition information including a predetermined temperature determination value, a predetermined moisture determination value, and a predetermined power supply time determination value. The condensation determination information may further include the measured moisture level and the measured power supply interruption time. The condensation determiner may determine that there is a possibility of condensation, when the measured apparatus temperature is smaller than the temperature determination value, the measured moisture level is larger than the moisture determination value, and the measured power supply interruption time is larger than the power supply time determination value.

The preparation waiting time setter may set a period of time obtained by adding correction values obtained by converting the measured apparatus temperature, the measured moisture level, and the measured power supply interruption time by respective predetermined correction coefficients to a predetermined extension reference time as the preparation waiting time.

The preparation waiting time set by the preparation waiting time setter may be controlled by subtraction in consideration of a use time of the image-forming apparatus to date.

When a predetermined cancel condition for canceling the preparation process is met after the target temperature determiner determines that the periodically-measured fusing temperature reached the predetermined target temperature and before the set preparation waiting time elapses, the preparation processor may cancel the preparation process even before the set preparation waiting time elapses.

The cancel condition for canceling the preparation process may include a print request for single-sided printing, a document reading request that does not involve printing, an open operation of a door attached to the image-forming apparatus, and a request for shifting to a sleep state.

When a predetermined resume condition for resuming the preparation process is met after the preparation process is canceled since the cancel condition is met, and when the condensation determiner performs the condensation determination and determines that there is a possibility of condensation occurring inside the image-forming apparatus, the preparation processor may resume the preparation process.

According to another aspect of the present disclosure, an image-forming apparatus having a printing function includes an apparatus temperature sensor that measures an apparatus temperature inside the image-forming apparatus, a condensation determiner that determines whether there is a possibility of condensation occurring inside the image-forming apparatus using predetermined condensation determination information including the measured apparatus temperature, a preparation waiting time setter that sets a preparation waiting time using the condensation determination information when the condensation determiner determines that there is a possibility of condensation occurring inside the image-forming apparatus, a preparation processor that performs a preparation process for executing the printing function when the image-forming apparatus is powered, and a fusing temperature sensor that measures a fusing temperature of a fusing device. Counting of the preparation waiting time is started when the preparation process is started. The preparation processor cancels the preparation process after it is determined that a current fusing temperature measured by the fusing temperature sensor reached a predetermined target temperature and the counted preparation waiting time elapsed.

According to a further aspect of the present disclosure, an anti-condensation method of an image-forming apparatus having a printing function includes measuring an apparatus temperature inside the image-forming apparatus when the image-forming apparatus is powered, determining whether there is a possibility of condensation occurring inside the image-forming apparatus using predetermined condensation determination information including the measured apparatus temperature, setting a preparation waiting time using the condensation determination information when it is determined that there is a possibility of condensation occurring inside the image-forming apparatus, starting a preparation process for executing the printing function, starting counting of the preparation waiting time when the preparation process is started, periodically measuring a current fusing temperature of a fusing device during the preparation process, determining that the periodically-measured fusing temperature reached a predetermined target temperature, and canceling the preparation process after it is determined that the periodically-measured fusing temperature reached the predetermined target temperature and the counted preparation waiting time elapsed.

According to the present disclosure, when the image-forming apparatus is powered and the condensation determiner determines that there is a possibility of condensation occurring inside the image-forming apparatus, a preparation waiting time may be set using the condensation determination information and the preparation processor starts the preparation process. After it is determined that a periodically-measured fusing temperature reached a predetermined target temperature and a counted preparation waiting time elapsed, the preparation process is canceled. Accordingly, when condensation may occur, in particular, when double-sided printing is performed, degradation in image quality due to condensation may be suppressed.

BRIEF DESCRIPTION OF THE DRAWINGS

FIG. 2A is a diagram illustrating an example of a period of time required for anti-condensation control (a print preparation process) when condensation does not occur according to the present disclosure.

FIG. 2B is a diagram illustrating an example of a period of time required for anti-condensation control (a print preparation process) when condensation occurs according to the present disclosure.

FIG. 3A is a diagram illustrating an example of a case where a condition for canceling the anti-condensation control (the print preparation process) is met according to the present disclosure.

FIG. 4 is a diagram illustrating an example of a case where a condition for resuming the anti-condensation control (the print preparation process) is met according to the present disclosure.

FIG. 9 is a diagram illustrating an example of information stored in a storage of the image-forming apparatus according to the present disclosure.

DESCRIPTION OF THE PREFERRED EMBODIMENTS

An embodiment of the present disclosure will be described hereinafter with reference to the accompanying drawings. Note that the present disclosure is not limited to the description of the embodiment below.

Configuration of Image-Forming Apparatus

Figure 1:
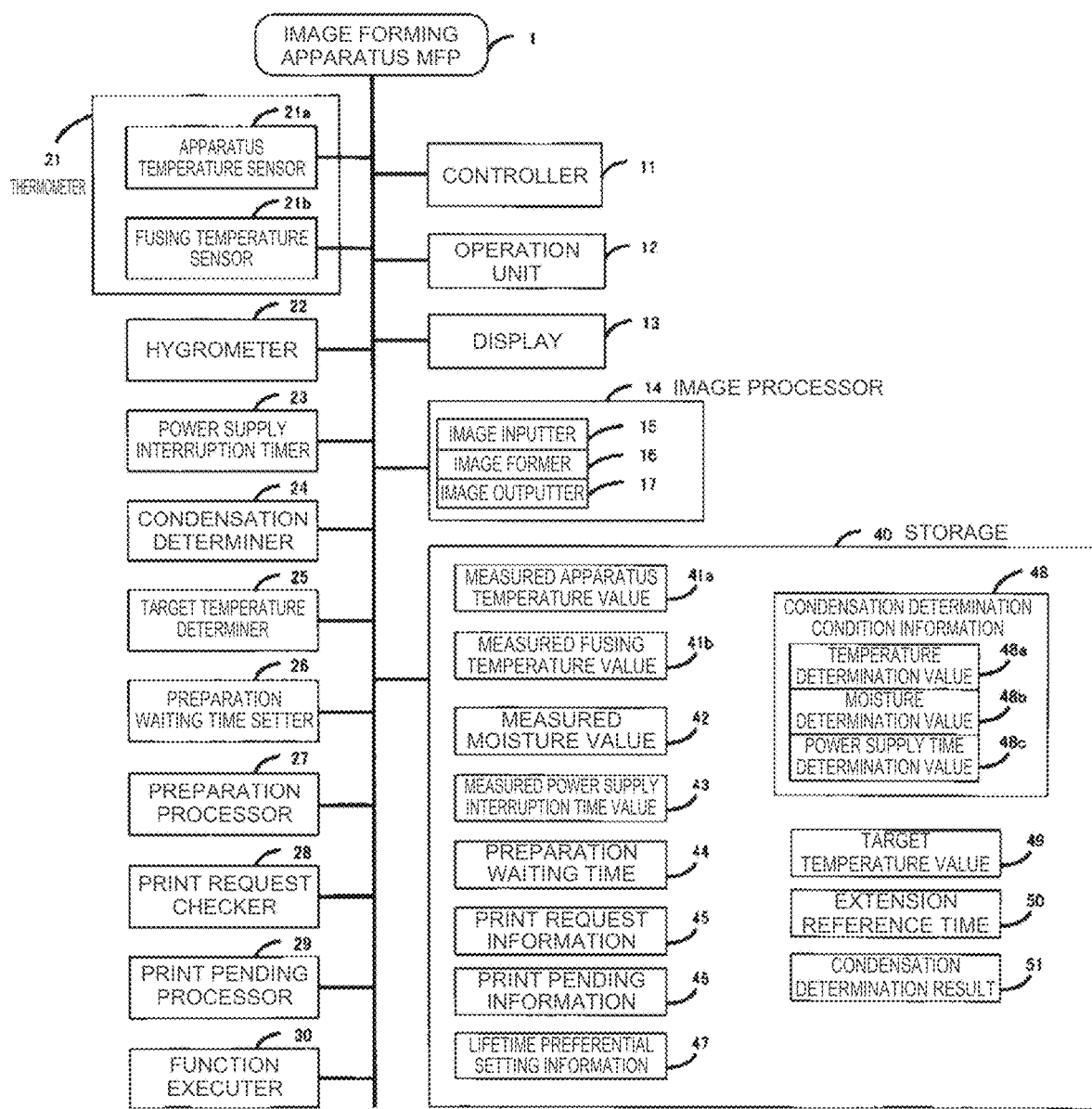
FIG. 1 is a block diagram illustrating an example of a configuration of an image-forming apparatus according to the present disclosure.

FIG. 1 is a block diagram illustrating an example of a configuration of an image-forming apparatus according to the present disclosure.

An image-forming apparatus (also referred to as a multifunction peripheral (MFP) hereinafter) 1 processes image data. Examples of the image-forming apparatus include an electronic apparatus having a copying function, a printing function, a document reading (scanning) function, a document editing function, a document saving function, a document transmitting (faxing, FAX) function, a communication function, and the like.

Although, in the example below, the image-forming apparatus 1 according to the present disclosure particularly has a printing function and a document reading (scanning) function, the image-forming apparatus 1 may have other functions.

In FIG. 1, the image-forming apparatus (MFP) 1 according to the present disclosure mainly includes a controller 11, an operation unit 12, a display 13, an image processor 14, a thermometer 21 (including an apparatus temperature sensor 21a and a fusing temperature sensor 21b), a hygrometer 22, a power supply interruption timer 23, a condensation determiner 24, a target temperature determiner 25, a preparation waiting time setter 26, a preparation processor 27, a print request checker 28, a print pending processor 29, a function executer 30, and a storage 40.

The image processor 14 mainly includes an image inputter 15, an image former 16, and an image outputter 17.

The controller 11 is a component that controls operations of individual components, such as the operation unit and the image processor, and is implemented by a microcomputer that mainly includes a central processing unit (CPU), a read-only memory (ROM), a random-access memory (RAM), an input/output (I/O) controller, and a timer.

The CPU organically operates various types of hardware based on control programs stored in advance in the ROM or the like, and executes functions according to the present disclosure, such as an image forming function and a condensation determination function.

Furthermore, among the above components, the power supply interruption timer 23, the condensation determiner 24, the target temperature determiner 25, and a preparation waiting time setter 26 are functional blocks in which the CPU executes respective processes based on predetermined programs.

The operation unit 12 is an input device used by a user of the image-forming apparatus to input information and is used to perform a predetermined input operation for operating the image-forming apparatus. For example, the operation unit 12 is a component for inputting information, such as characters, and selecting and inputting a function, and a keyboard, a mouse, a touch panel, and the like, are used as the operation unit 12. Examples of keys to be operated by the user include an operation start key, a function selection key, and a setting key.

For example, the user performs a touch operation on a touch panel and an operation of inputting a start key for printing or reading to execute a printing function, a setting function, and the like.

The display 13 is a component for displaying information and displays information required for executing the various functions, results of execution of the functions, and the like for the user. For example, an LCD, an organic EL display, or the like is used, and when a touch panel is used as the operation unit 12, the display 13 and the touch panel are provided in a superimposed manner.

The display 13 uses characters, symbols, graphics, images, icons, animations, moving images, and the like, to display, for example, information required to set setting items used for printing and the like of the image-forming apparatus and to execute a printing function, a document reading function, and the like, and an operation screen for a selected function.

In particular, according to the present disclosure, a screen indicating that an anti-condensation control process is being executed while a requested double-sided printing process is pending is displayed on the display 13.

The image processor 14 is a component that executes an image forming function, which is a main function of the image-forming apparatus. The image processor 14 mainly includes an image inputter 15, an image former 16, and an image outputter 17.

The image inputter 15 is a component that mainly inputs predetermined image data. The image former 16 is a component that mainly converts the inputted image data into printable information or the like. The image outputter 17 is a component that mainly outputs the formed print information or the like on a printing sheet or the like.

The image inputter 15 is a component that inputs image data of a document including images, characters, graphics, or the like, and reads a document placed on a document table or the like.

A scanner (a reading device) that reads a document including information described thereon is used as the image inputter 15.

In order to read the document, the image-forming apparatus 1 includes a document placement table (the document table) on which the document is placed and a document cover that presses the document.

The image-forming apparatus 1 may further include an automatic document feeder (ADF) that receives a plurality of documents placed thereon and reads the documents while automatically conveying the documents one by one.

In this case, the documents including images and the like are read by the scanner so that image data on the documents is stored in the storage 40.

Furthermore, various methods may be employed for inputting image information.

For example, an interface for connecting an external storage medium, such as a USB flash drive, corresponds to the image inputter 15.

An electronic data file of the image information to be input, and the like, may be stored in an external storage medium, such as a USB flash drive, and the USB flash drive or the like may be coupled to an input interface, such as a USB terminal, a predetermined input operation may be performed by the operation unit 12 to read the desired electronic data file stored in the USB flash drive or the like, and the electronic data file may be stored as input image data in the storage 40.

For example, to print the input image data on a recording medium, the image former 16 generally performs steps for charging, exposing, developing, transferring, cleaning, static eliminating, and fusing in a continuous manner to form the input image data on the recording medium. In the developing step, a toner is supplied from a toner cartridge to a developing device, and an electrostatic latent image formed on a surface of a charged photoreceptor drum is developed to form a toner image corresponding to the electrostatic latent image. The toner image formed on the surface of the photoreceptor drum is transferred onto the recording medium by a transfer device, and then heated and fused on the recording medium by a fusing device.

Furthermore, the image former 16 also converts the input image data to information in a form that can be transferred or displayed.

The image outputter 17 is a component that outputs the formed input image data and corresponds to, for example, a printer that prints information, such as input image data. The image outputter 17 prints, on a predetermined printing sheet (a sheet medium), the input image data obtained by reading a document.

Note that the output of the input image data includes not only printing but also storage of input image data of a scanned document and fax transmission of input image data of a scanned document.

For example, storage of input image data obtained by reading a document in an external storage medium, such as a USB flash drive, transmission of input image data to another image-forming apparatus or a server via a network, such as the Internet, and classifying and saving of input image data into a specific saving folder also correspond to the image output.

The apparatus temperature sensor 21a measures a temperature inside the image-forming apparatus (referred to as an apparatus temperature), and a temperature sensor for a normal temperature range is used.

The apparatus temperature sensor 21a is a generally-used one, and a semiconductor temperature sensor, a thermistor and the like may be used, for example.

The apparatus temperature sensor 21a is preferably installed in the vicinity of a location where condensation is likely to occur, for example, near the fusing device of the image-forming apparatus or the like location.

The controller 11 periodically detects an electrical signal corresponding to a temperature output from the apparatus temperature sensor 21a, converts the detected electrical signal to a temperature, and stores the temperature as a current apparatus temperature value (a measured apparatus temperature value 41a) in the storage 40.

Since the current apparatus temperature value (the measured apparatus temperature value 41a) is used in a condensation determination, the apparatus temperature sensor 21a preferably measures a current temperature when the image-forming apparatus is turned on.

The fusing temperature sensor 21b measures a temperature of the fusing device (referred to as a fusing temperature), and a temperature sensor for a high temperature range is used.

The fusing temperature sensor 21b is a generally-used one, and a thermistor and the like may be used, for example.

The controller 11 periodically detects an electrical signal corresponding to a temperature output from the fusing temperature sensor 21b, converts the detected electrical signal to a temperature, and stores the temperature as a current fusing temperature value (a measured fusing temperature value 41b) in the storage 40.

The current fusing temperature value (the measured fusing temperature value 41b) is used to determine an end of a preparation process for performing a printing function.

The hygrometer 22 measures moisture inside the image-forming apparatus, and a moisture sensor is used.

The hygrometer 22 is a generally-used one, and a resistive sensor IC, a capacitive sensor IC, and the like may be used, for example.

The hygrometer 22 is preferably installed in the vicinity of a location where condensation is likely to occur, for example, a location near the fusing device of the image-forming apparatus or the like location.

The controller 11 periodically detects an electrical signal corresponding to moisture output from the hygrometer 22, converts the detected electrical signal to a moisture level, and stores the moisture level as a current moisture value (a measured moisture value 42) in the storage 40.

Since the current moisture value (the measured moisture value 42) is also used in the condensation determination, the hygrometer 22 preferably measures a current moisture when the image-forming apparatus is turned on.

The power supply interruption timer 23 measures a power supply interruption time which is a period of time in which power supply to the image-forming apparatus is interrupted.

The power supply interruption time means a period of time in which the power is not supplied to the image-forming apparatus (a power off time) and mainly corresponds to a period of time in which the fusing device, various motors, and the like are in a cooling state.

For example, a period of time in which main power of the image-forming apparatus is not supplied is measured.

Alternatively, a period of time in which power is not supplied to the fusing device, various motors, and the like inside the image-forming apparatus even though the main power is turned on may be measured.

To measure the power supply interruption time, for example, the controller 11 stores a time point when the main power of the image-forming apparatus is turned off (OFF), then stores a time point when the main power of the image-forming apparatus is turned on (ON), and stores a period of time from when the main power is turned off (OFF) to when the main power is turned on (ON) in the storage 40 as a measured power supply interruption time value 43 described below.

Since the measured power supply interruption time value 43 is also used in the condensation determination, the power supply interruption timer 23 preferably measures a power supply interruption time when the image-forming apparatus is turned on.

The condensation determiner 24 determines whether condensation may occur inside the image-forming apparatus by using predetermined condensation determination information.

The condensation determination information is used in the following condensation determination conditions. Examples of the condensation determination conditions include an apparatus temperature measured by the apparatus temperature sensor 21a, a moisture level measured by the hygrometer 22, a power supply interruption time measured by the power supply interruption timer 23.

In particular, it is determined that condensation may occur on the photoreceptor drum, guide members of a sheet conveying path, and the like among the components disposed inside the image-forming apparatus.

Since condensation occurs mainly when an internal temperature rapidly rises, the condensation determination is performed when the image-forming apparatus is turned on.

Alternatively, the condensation determination may be performed when returning to a normal operation state from a so-called sleep state.

A determination as to whether condensation may be occurring is mainly made by the following three conditions.

Condensation Determination Condition 1: A current temperature (a measured apparatus temperature value: Ta1) measured by the apparatus temperature sensor 21a is less than a predetermined temperature (a temperature determination value: Th) (Ta1<Th).

Condensation Determination Condition 2: A current moisture level (a measured moisture value: H1) measured by the hygrometer 22 is greater than a predetermined moisture level (a moisture determination value: Hh) (H1>Hh).

Condensation Determination Condition 3: The measured power supply interruption time value 43 (PT) measured by the power supply interruption timer 23 is greater than a predetermined period of time (a power supply time determination value: Ph) (PT>Ph).

When all the three condensation determination conditions are met, it is determined that condensation may be occurring.

On the other hand, when at least one of the three condensation determination conditions is not met, it is determined that there is no possibility of condensation occurring.

As described below, when there is a possibility that condensation is occurring, information indicating the possibility of condensation (e.g., 1) is set in a condensation determination result KH.

When there is no possibility that condensation is occurring, information indicating no possibility of condensation (e.g., 0) is set in the condensation determination result KH.

The three determination values (Th, Hh, and Ph) used for the condensation determination are stored in the storage 40 in advance as fixed values.

The three determination values (Th, Hh, and Ph) may be set in the same way for all image-forming apparatuses, but since the possibility of condensation occurring may be varied among the image-forming apparatuses, the possibility is preferably set for each image-forming apparatus in consideration of an installation environment of the image-forming apparatus, an arrangement configuration of the internal components, an installation region, and the like.

For example, the temperature determination value Th may be set in consideration of a temperature of the installation environment and the like. The moisture determination value Hh can be set in consideration of a temperature and a humidity of the installation environment and the like. The power supply time determination value Ph may be set in consideration of a natural cooling rate of the image-forming apparatus and other factors.

The condensation determination conditions are not limited to the above three conditions, and other conditions may be employed.

In the above description, it is determined that condensation may be occurring when all the three condensation determination conditions are met. However, it may be determined that condensation may be occurring when two of the three condensation determination conditions (the condensation determination conditions 1 and 2, for example) are met in consideration of the installation location of the image-forming apparatus.

The target temperature determiner 25 determines whether a current fusing temperature (a measured fusing temperature value: Tb1) measured by the fusing temperature sensor 21b has reached a predetermined target temperature (a target temperature value: T0).

When the measured fusing temperature value Tb1 becomes equal to or larger than the predetermined target temperature value T0, it is determined that the target temperature has been reached.

The target temperature value T0 means a lowest temperature at which the fusing device can demonstrate stable fusing performance, and is set and stored in advance based on, for example, a printing speed and an installation region.

When there is no condensation and the measured fusing temperature value Tb1 has reached the target temperature value T0, a preparation process of the image-forming apparatus is terminated.

The preparation process is performed to enable normal execution of functions that are executable by the image-forming apparatus, and is a so-called warm-up process.

Since the image-forming apparatus of the present disclosure particularly has a printing function, the preparation process means a process for executing the printing function, and therefore, is also referred to as a print preparation process.

When the print preparation process is terminated, at least the printing function may be normally performed in the image-forming apparatus. Specifically, printing with set image quality may be performed.

The preparation waiting time setter 26 sets a preparation waiting time indicating a period of time in which the preparation process is performed.

The preparation waiting time (also referred to as an extension time) is set after being calculated by a predetermined formula as described below using the condensation determination information.

Even when there is no condensation in the image-forming apparatus, the print preparation process is executed for a period of time until the measured fusing temperature value Tb1 reaches the target temperature value T0, so that the developing and fusing processes of the image-forming apparatus are normally performed.

When there is no condensation, the print preparation process is terminated when the measured fusing temperature value Tb1 reaches the target temperature value T0, and thereafter, a print job becomes executable (a print job executable state).

On the other hand, when there is condensation, the print preparation process (the warm-up process) is preferably performed for a longer period of time to remove the condensation.

Therefore, when there is condensation, the period of time in which the print preparation process (the warm-up process) is executed is extended according to a degree of the condensation.

In other words, when the condensation determiner 24 determines that condensation may be occurring inside the image-forming apparatus, the preparation waiting time setter 26 uses the condensation determination information to set a preparation waiting time.

When there is condensation, the period of time in which the print preparation process is executed is extended even when the measured fusing temperature value Tb1 has reached the target temperature value T0.

The extended period of time in which the print preparation process is executed corresponds to the preparation waiting time NT.

Although details are described below, as the preparation waiting time NT, for example, a time obtained by adding correction values obtained by converting the measured apparatus temperature (the measured apparatus temperature value Ta1), the measured moisture (the measured moisture value H1), and the measured power supply interruption time (the measured power supply interruption time value PT) by the respective prescribed correction factors to the predetermined extension reference time N0.

When there is condensation, in principle, a print job may not be executed (print job inexecutable state) after the print preparation process is started and until the preparation waiting time NT elapses, since the print preparation process is being performed, and a print job may be executed (print job executable state) after the preparation waiting time NT elapses.

When the image-forming apparatus is installed in a position where condensation is unlikely to occur, and when efficiency of a printing time is important, the preparation waiting time NT set by the preparation waiting time setter 26 may be controlled by subtraction in consideration of a period of time in which the image-forming apparatus has been in use to date.

The preparation processor 27 performs a preparation process for enabling normal execution of printing and other functions of the image-forming apparatus, and in particular, performs the print preparation process for executing the printing function.

In the preparation process (the warm-up process), for example, a temperature control process of the fusing device, an output voltage control process of the image former, starting up of a motor of a laser unit, and the like are performed.

In the temperature control process of the fusing device, a motor that rotates a fusing roller included in the fusing device is activated and a heater included in the fusing device is activated to generate heat.

When the heater generates heat, a temperature in the air around the heater is gradually increased to prevent condensation from forming on the guide members and conveying rollers in the sheet conveying path due to the heat of the heater.

As described above, in principle, the print preparation process is terminated when the measured fusing temperature value Tb1 has reached the target temperature value T0 in the case of no condensation, and is terminated when the preparation waiting time NT has elapsed in the case where condensation is occurring.

However, as described below, the print preparation process may be terminated also when the conditions for canceling the print preparation process are met.

As described in detail below, when a predetermined cancel condition that requires cancel of the preparation process is met after it is determined by the target temperature determiner 25 that a periodically measured temperature has reached a predetermined target temperature and before the set preparation waiting time NT has elapsed, the preparation processor 27 cancels the preparation process even before the set preparation waiting time NT elapses.

Examples of the cancel conditions for canceling the preparation process include a request for single-sided printing, a request for reading on a document not to be printed, an operation of opening a door attached to the image-forming apparatus, and a request for entering a sleep state.

For example, in the case where condensation is occurring, when a single-sided printing request is input during the print preparation process after the measured fusing temperature value Tb1 reaches the target temperature value T0, the print preparation process is terminated.

Furthermore, when a predetermined resume condition for resuming the preparation process is met after the preparation process is canceled due to the occurrence of the cancel condition, the condensation determiner 24 performs a condensation determination. When the condensation determiner 24 determines that condensation may be occurring inside the image-forming apparatus, the preparation processor 27 may resume the preparation process.

Examples of the resume conditions for resuming the preparation process include a request for canceling reading of a document, an operation of closing the door attached to the image-forming apparatus, and a request for resuming the normal operation state from the sleep state.

The print request checker 28 checks issuance of a print request for starting the printing function.

For example, the print request checker 28 checks whether an operation of inputting a print request has been performed by the user.

When the operation unit 12 includes a dedicated print start key, the print request checker 28 checks whether the print start key has been input.

When the print start key has been input, it is determined that an operation of inputting a print request has been performed.

When "single-sided printing" and "double-sided printing" are available as print setting items, the print request checker 28 checks whether "single-sided printing" or "double-sided printing" has been selected.

When "single-sided printing" is selected and the print start key is input, a print job of "single-sided printing" is executed.

When "double-sided printing" is selected and the print start key is input, a print job of "double-sided printing" is executed.

In the present disclosure, as described in the following example, in a case where the condensation determiner 24 determines that condensation may be occurring inside the image-forming apparatus, when the print request checker 28 determines that a single-sided printing request for performing printing only on a front surface of a printing sheet has been issued after the target temperature determiner 25 determines that a fusing temperature periodically measured has reached a predetermined target temperature and before a set preparation waiting time elapses, the requested single-sided printing is executed after the preparation processor 27 cancels the preparation process.

The print pending processor 29 suspends a print job corresponding to an issued print request.

While the print preparation process is being executed to prevent condensation, the condensation may not yet be sufficiently removed, and therefore, when a print request is input and a print job corresponding to the print request is executed while the print preparation process is being executed, printing with normal image quality may not attained.

Therefore, in principle, the requested print job is not to be executed while the print preparation process is being executed since printing with normal image quality may not be attained.

When all input print requests are canceled, re-operation of the print requests is a large burden for the user, and therefore, jobs of the requested print requests are suspended when the image-forming apparatus is in a state in which printing is not to be performed.

In particular, in a case where a print request for a print job corresponding to double-sided printing is issued during the execution of the print preparation process, a print request for double-sided printing is pending, since it is highly likely that deterioration of image quality occurs when the print job is immediately executed.

When a print job requested for printing is pending, information about the requested print job (print request information) is stored in the storage 40 as print pending information 46.

Furthermore, for example, information indicating that the preparation process for performing normal printing is being executed is displayed on the display 13 by a message "print pending" or "anti-condensation is being performed" so as to notify the user of a waiting state.

Once the print preparation process is terminated, printing for the pending print job is automatically executed.

In the present disclosure, as described in the following example, particularly in a case where the condensation determiner 24 determines that condensation may be occurring inside the image-forming apparatus, when the print request checker 28 determines that a double-sided printing request for performing printing on both surfaces of a printing sheet has been issued after the target temperature determiner 25 determines that a fusing temperature periodically measured has reached a predetermined target temperature and before a set preparation waiting time elapses, the print pending processor 29 suspends a print job corresponding to the requested double-sided printing.

Then, after the set preparation waiting time elapses, the preparation processor 27 cancels the preparation process and executes the requested double-sided printing.

Furthermore, when the print request checker 28 determines that a print request for the single-sided printing has been issued in a state in which the print pending processor 29 suspends a print job of the requested double-sided printing, the preparation processor 27 may cancel the preparation process before the set preparation waiting time elapses and executes the pending double-sided printing after the requested single-sided printing is performed.

The function executer 30 executes a function selected by the user using the operation unit 12.

In principle, the selected function is performed based on a set value of a setting item that is currently set.

For example, when the printing function is selected, the user inputs and operates the print start key to execute document reading and a printing process based on current setting values of setting items related to the printing function (e.g., double-sided printing, the number of copies, a document size, monochrome printing, etc.).

The storage 40 stores information and programs required for executing individual functions of the image processing apparatus of the present disclosure, and a semiconductor storage device, such as a ROM, a RAM, or a flash memory, a storage device, such as an HDD, or an SSD, or any other storage medium is used.

The storage 40 stores, for example, the measured apparatus temperature value 41a, the measured fusing temperature value 41b, the measured moisture value 42, the measured power supply interruption time value 43, a preparation waiting time 44, print request information 45, the print pending information 46, lifetime preferential setting information 47, condensation determination condition information 48, a target temperature value 49, an extension reference time 50, and a condensation determination result 51. The condensation determination condition information 48 includes a temperature determination value 48a, a moisture determination value 48b, and a power supply time determination value 48c.

FIG. 9 is a diagram illustrating information stored in the storage 40 of the image-forming apparatus according to the example.

In FIG. 9, specific numerical examples of individual stored information items are also shown.

The measured apparatus temperature value 41a is a current temperature inside the apparatus (Ta1) measured by the apparatus temperature sensor 21a.

The measured fusing temperature value 41b is a current fusing temperature (Tb1) measured by the fusing temperature sensor 21b described above.

The measured moisture value 42 is a current moisture level (H1) measured by the hygrometer 22 described above.

The measured power supply interruption time value 43 is a power supply interruption time (PT) measured by the power supply interruption timer 23 described above.

The measured apparatus temperature value 41a (Ta1), the measured moisture value 42 (H1), and the measured power supply interruption time value 43 (PT) correspond to the condensation determination information described above.

The preparation waiting time 44 is a period of time (NT) set by the preparation waiting time setter 26 described above.

The print request information 45 is associated with a print job requested by the user.

For example, the print request information 45 includes a print side, the number of copies, color/monochrome distinction, a document size, a printing sheet size, and a print file name, as illustrated in FIG. 9.

In the print request information 45 in FIG. 9, a print job is stored with a print file name of "FL001", a document size of "A4", a printing sheet size of "A4", the number of copies of "2", and a setting of printing on one side in monochrome.

The print pending information 46 is associated with a print job that is pending by the print pending processor 29 as described above.

For example, as with the print request information 45, the print pending information 46 includes a print side, the number of copies, color/monochrome distinction, a document size, a printing sheet size, and a print file name, as illustrated in FIG. 9.

In the print pending information 46 in FIG. 9, a print job is stored with a print file name of "FL200", a document size of "B5", a printing sheet size of "B5", the number of copies of "4", and a setting of printing on both sides in color.

The lifetime preferential setting information 47 sets whether a lifetime (actual operating time) or the like of the image-forming apparatus is to be taken into consideration when the preparation waiting time NT is set. As illustrated in FIG. 9, valid (1) or invalid (0) is set in the lifetime preferential setting information 47.

As described above, a comparatively long period of time is preferably set to the preparation waiting time NT from the viewpoint of sufficient condensation control.

However, in a case where a use pattern of the image-forming apparatus is mostly single-sided printing and double-sided printing is not performed, an adverse effect of condensation is considered to be minimal, and therefore, even when the preparation waiting time NT is reduced, there will be few problems with the use of the image-forming apparatus. Alternatively, the long preparation waiting time NT may not be required since lifetimes of the components, such as the fusing device, are reduced when the print preparation process is executed for a long period of time with the long preparation waiting time NT.

Furthermore, in a case where the image-forming apparatus is installed in a location where condensation hardly occurs, degradation in image quality due to condensation is negligible, and when improvement of the lifetimes of the components and efficiency of the printing time are more important than the print image quality, the preparation waiting time NT may be short.

Therefore, when priority is to be given to a lifetime of the image-forming apparatus (actual operating hours), etc., the lifetime preferential setting information 47 is set to valid (1).

When the lifetime preferential setting information 47 is set to valid (1), the preparation waiting time NT is reduced as described below.

When the lifetime preferential setting information 47 is set to valid (1), the preparation waiting time NT set by the preparation waiting time setter 26 is used after being reduced by a predetermined amount of time.

On the other hand, when the condensation control is more important than the lifetime of the image-forming apparatus (actual operating hours), etc., the lifetime preferential setting information 47 is set to invalid (0).

When the lifetime preferential setting information 47 is set to invalid (0), the preparation waiting time NT set by the preparation waiting time setter 26 is used as it is.

The condensation determination condition information 48 is associated with conditions for determining whether condensation may occur. When the possibility of condensation is determined based on the above three conditions (the condensation determination conditions), the condensation determination condition information 48 includes a temperature determination value 48a, a moisture determination value 48b, and a power supply time determination value 48c.

The temperature determination value 48a (Th) is information for making a determination associated with a temperature among the condensation determination conditions.

In FIG. 9, for example, 10 degrees centigrade is set as the temperature determination value Th. As described above, the condensation determination condition is met when the measured apparatus temperature value Ta1 is lower than the temperature determination value Th.

Note that, although the temperature determination value Th is set and stored in advance, the temperature determination value Th is not a fixed value, but is preferably set for each image-forming apparatus in consideration of an installation environment of the image-forming apparatus, an arrangement configuration of the internal components, and an installation region.

The moisture determination value 48b is information for making a determination associated with a moisture level among the condensation determination conditions.

In FIG. 9, for example, 50 (%) is set as the moisture determination value Hh. As described above, the condensation determination condition is met when the measured moisture value H1 is higher than the moisture determination value Hh.

Note that, although the moisture determination value Hh is also set and stored in advance, the moisture determination value Hh is not a fixed value, but is preferably set for each image-forming apparatus in consideration of an installation environment of the image-forming apparatus, an arrangement configuration of the internal components, and an installation region.

The power supply time determination value 48c is information for making a determination associated with the power supply interruption time among the condensation determination conditions.

In FIG. 9, for example, 5 (hours) is set as the power supply time determination value Ph. As described above, the condensation determination condition is met when the measured power supply interruption time value PT is higher than the power supply time determination value Ph.

Note that, although the power supply time determination value Ph is also set and stored in advance, the power supply time determination value Ph is not a fixed value, but is preferably set for each image-forming apparatus in consideration of an installation environment of the image-forming apparatus, a natural cooling rate of the image-forming apparatus, and other factors.

The target temperature value 49 is, in principle, information to which a fusing temperature for terminating the print preparation process is set when there is no condensation.

In FIG. 9, for example, 160 degrees centigrade is set as the target temperature value T0.

In general, when the image-forming apparatus is not in use, the power supply to the image-forming apparatus is stopped, and therefore, the inside of the image-forming apparatus is cooled and the temperature inside is relatively low.

When the image-forming apparatus is turned on, the print preparation process is started to prevent condensation and a temperature inside the image-forming apparatus rises, but the print preparation process is terminated when the measured fusing temperature value Tb1 reaches the target temperature value T0.

The target temperature value T0 may be set and stored in advance as a fixed value, or may be set for each image-forming apparatus in consideration of an installation environment of the image-forming apparatus, a printing speed, and an installation region.

The extension reference time 50 is information used by the preparation waiting time setter 26 when the preparation waiting time NT is set, and is information serving as a reference for determining a period of time in which the print preparation process is executed.

In FIG. 9, for example, 4 (minutes) is set as the extension reference time N0. As described below, a preparation waiting time NT that is longer than the extension reference time N0 is set based on the extension reference time N0. The extension reference time N0 may be set and stored in advance as a fixed value, or may be set for each image-forming apparatus in consideration of an installation environment of the image-forming apparatus and an expected level of condensation.

Furthermore, the following correction coefficients are set and stored in advance as information to be used when the preparation waiting time NT is set.

For example, as described below, a temperature correction coefficient KA, a moisture correction coefficient KB, and a power supply interruption time correction coefficient KC are set and stored in advance and used to calculate a temperature correction value Tc, a moisture correction value Hc, and an interruption time correction value Pc, respectively.

The temperature correction value Tc is a value obtained by multiplying the measured apparatus temperature value Ta1 by the temperature correction coefficient KA (Tc=Ta1× KA).

The moisture correction value Hc is obtained by multiplying the measured moisture value H1 by the moisture correction coefficient KB (Hc=H1×KB). The interruption time correction value Pc is obtained multiplying the measured power supply interruption time value PT by the power supply interruption time correction coefficient KC (Pc=PT× KC).

As described below, the preparation waiting time NT is calculated, for example, by adding the temperature correction value Tc, the moisture correction value Hc, and the interruption time correction value Pc to the extension reference time N0 (NT=N0+Tc+Hc+Pc).

The condensation determination result 51 is information indicating a result of the condensation determination.

For example, when it is determined that there is a possibility of condensation, 1 is set as the condensation determination result (KH) 51.

For example, when it is determined that there is no possibility of condensation, 0 is set as the condensation determination result (KH) 51.

Example of Anti-Condensation Control (Print Preparation Process)

The following is an example of a process related to the print preparation process performed in the anti-condensation control according to the present disclosure.

The anti-condensation control is executed when the image-forming apparatus is turned on.

According to the present disclosure, anti-condensation is mainly performed by, for example, executing the following processes, when power is on.

Outline of Anti-Condensation Method of Image-Forming Apparatus Apparatus Temperature Measuring Step When the image-forming apparatus is turned on, the apparatus temperature sensor 21a measures a temperature inside the image-forming apparatus.

Condensation Determination Step

The condensation determiner 24 determines whether condensation may be occurring inside the image-forming apparatus by using the predetermined condensation determination information including a measured temperature in the apparatus.

Preparation Waiting Time Setting Step

When it is determined that condensation may be occurring inside the image-forming apparatus in the condensation determination step, the preparation waiting time setter 26 uses the condensation determination information to set the preparation waiting time NT.

Preparation Process Execution Step

The preparation processor 27 starts the preparation process for executing the printing function.

Preparation Waiting Time Count Starting Step

When the preparation process is started, counting of the preparation waiting time NT is started.

Here, the controller 11 activates a timer that checks elapse of the preparation waiting time NT.

Current Fusing Temperature Measuring Step

During the execution of the preparation process, the fusing temperature sensor 21b periodically measures a current fusing temperature.

Target Temperature Determination Step

The target temperature determiner 25 determines that the periodically measured fusing temperature has reached the predetermined target temperature.

Preparation Process Cancel Step

After it is determined that the periodically measured fusing temperature has reached the predetermined target temperature and after the counted preparation waiting time NT has elapsed, the preparation processor 27 cancels the preparation process.

First Example

Anti-Condensation Control (Print Preparation Process) with No Condensation

FIG. 2A is a diagram illustrating a period of time required for the anti-condensation control (the print preparation process) when condensation does not occur according to a first example.

This section describes a case where the anti-condensation control is started, and when a measured current fusing temperature value Tb1 has reached the predetermined target temperature value T0 with no condensation, the anti-condensation control is terminated. A process executed in the anti-condensation control is also referred to as the print preparation process or an anti-condensation process.

For example, the anti-condensation control is started when the user turns on the image-forming apparatus.

In the anti-condensation control, first, the condensation determiner 24 performs a condensation determination process so as to check the three condensation determination conditions described above.

In FIG. 2A, when it is determined that there is no possibility of condensation in the check of the condensation determination conditions, the print preparation process is started.

In the print preparation process, temperature control of the fusing device is performed such that the heater of the fusing device is operated and the motor is activated so as to rotate the fusing rollers of the fusing device. The print preparation process is performed until the temperature Tb1 measured by the fusing temperature sensor 21b reaches the target temperature value T0.

Specifically, with no condensation, when the measured current fusing temperature value Tb1 has reached the target temperature value T0, the print preparation process is terminated and a print job executable state is entered.

After the measured current fusing temperature value Tb1 has reached the target temperature value T0, printing may be performed with normal image quality when the printing process and the like are executed.

Figure 5:
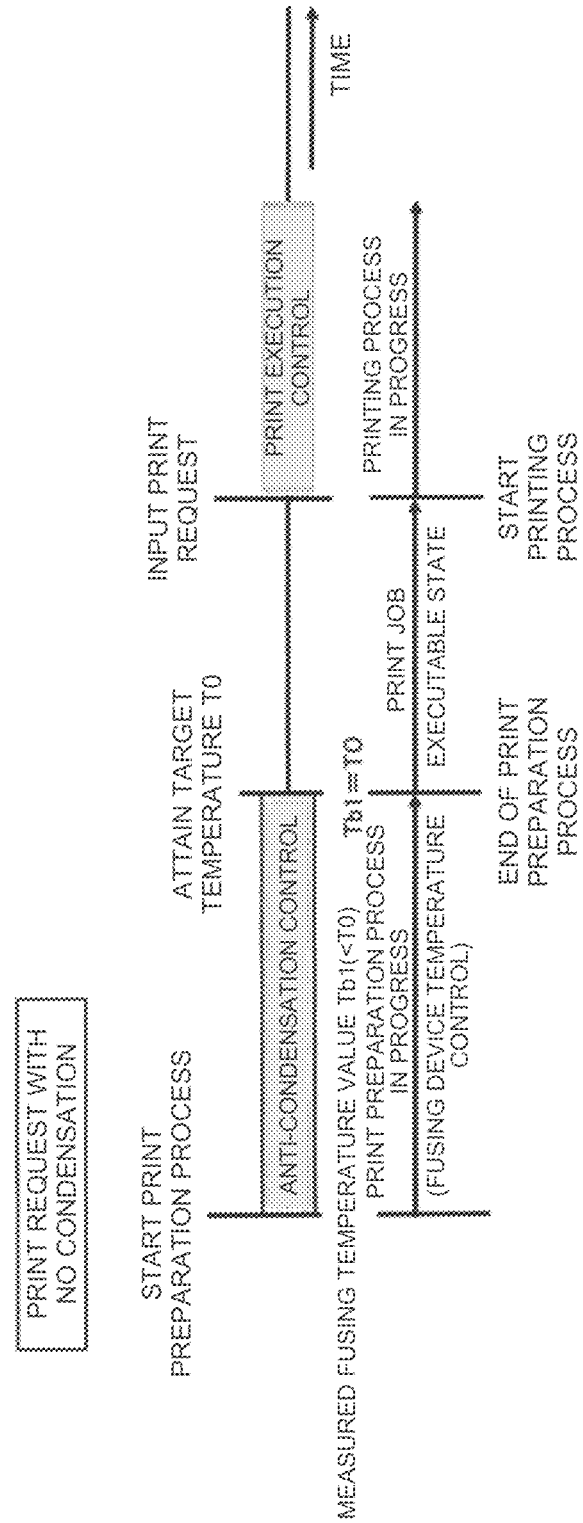
FIG. 5 is a diagram illustrating an example of a case where a print request is issued after the anti-condensation control (the print preparation process) is performed with no condensation according to the present disclosure.

FIG. 5 is a diagram illustrating a case where, with no condensation, a print request is issued after the anti-condensation control (the print preparation process) is performed according to the example.

In the print job executable state, as shown in FIG. 5, when an input operation of a print request is performed, the printing process is immediately started based on the print request information 45.

When a state in which the image-forming apparatus is not in use continues for a predetermined period of time or more although the image-forming apparatus has already been turned on, the image-forming apparatus enters a sleep state to save power.

The fusing device and the like are not energized in the sleep state, and therefore, a portion near the fusing apparatus is cooled.

When a key operation is performed on the operation unit 12 of the image-forming apparatus in the sleep state, for example, the image-forming apparatus returns from the sleep state to the normal operation state. Also in this case, the print preparation process is started as shown in FIG. 2A so that the normal printing function may be executed.

Second Example

Anti-Condensation Control (Print Preparation Process) with Condensation

FIG. 2B is a diagram illustrating an example of a period of time required for the anti-condensation control (the print preparation process) when condensation occurs.

This section describes a case where the anti-condensation control is started, and with condensation, even when a measured current fusing temperature value Tb1 reaches the predetermined target temperature value T0, the anti-condensation control is continued. Thereafter, when the preparation waiting time NT has elapsed, the anti-condensation control is terminated. As with the first example above, for example, when the user turns on the image-forming apparatus, the anti-condensation control is started and the condensation determiner 24 performs the condensation determination process where the three condensation determination conditions are checked.

In FIG. 2B, even when it is determined that there is a possibility of condensation according to the check of the condensation determination conditions, the print preparation process is started after the preparation waiting time setting process is performed.

In the preparation waiting time setting process, the preparation waiting time NT is set in consideration of the three measured values for the condensation determination.

Specifically, a period of time serving as an extension of the period of time in which the print preparation process is executed is set.

When the print preparation process is started, a timer for the preparation waiting time NT is activated, and the print preparation process continues even after the measured current fusing temperature value Tb1 has reached the predetermined target temperature value T0.

During the print preparation process, execution of a print job is disabled. During this period, even when a print request for double-sided printing is issued, the print request is pending until the print preparation process is terminated.

When the timer for the preparation waiting time NT times out, the print preparation process is terminated and the print job is ready for execution.

In the case where condensation occurs, it is regarded that when the printing process or the like is executed after the measured current fusing temperature value Tb1 becomes equal to or greater than the target temperature value T0 and the preparation waiting time NT has elapsed, an adverse effect of the condensation is reduced, and accordingly, printing may be performed with normal image quality.

Therefore, when there is condensation, the print preparation process is executed for a longer period of time than when there is no condensation, and after the preparation waiting time NT has elapsed, the print job executable state is entered so that degradation of image quality in printing may be suppressed.

In the print job executable state, the printing process is immediately started when a print request is input.

Third Example

Figure 3B:
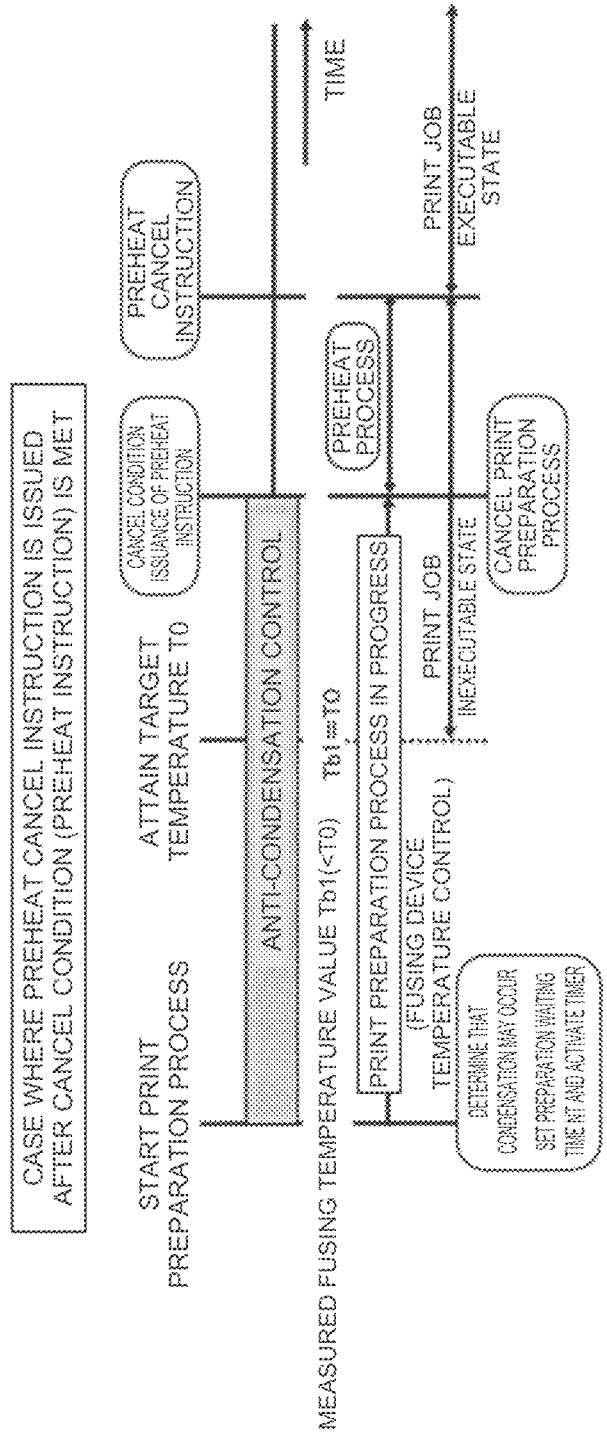
FIG. 3B is a diagram illustrating an example of a case where a condition for canceling the anti-condensation control (the print preparation process) is met according to the present disclosure.

Case where Condition for Canceling Anti-Condensation Control (Print Preparation Process) is Met FIGS. 3A and 3B are diagrams illustrating examples of a case where a condition for canceling the anti-condensation control (the print preparation process) is met.

This section describes a case where the anti-condensation control is started, and with condensation, when a predetermined cancel condition is met in the state in which the anti-condensation control is continued after a measured current fusing temperature value Tb1 has reached the predetermined target temperature value T0, the anti-condensation control (the print preparation process) is canceled (terminated).

As shown in the second example above, when there is condensation, the print preparation process is executed in principle until the preparation waiting time NT elapses.

However, it is preferable to cancel (terminate) the anti-condensation control (the print preparation process) when any of the following cancel conditions occur even while the print preparation process is being executed.

The following conditions are listed as the conditions for canceling the anti-condensation control.

Cancel Condition 1 (Single-Sided Printing Request): A case where a single-sided printing request is input.

Cancel Condition 2 (Document Reading Request): A case where a document reading request is input.

Cancel Condition 3 (Sleep Shifting Request): A case where a request for shifting to the sleep state is input.

Cancel Condition 4 (Panel Open Operation): A case where the door (panel) of the image-forming apparatus is opened.

Cancel Condition 5 (Preheating Shifting Instruction): A case where an instruction for shifting to a preheating state is issued.

Cancel Condition 6 (Exclusive SIM Shifting Request): A case where shifting by exclusive SIM is requested.

When a single-sided printing request corresponding to Cancel Condition 1 (Single-Sided Printing Request) is input, an adverse effect of condensation may be relatively less than in the case of double-sided printing, and therefore, pending of the requested single-sided printing until the preparation waiting time NT has elapsed may not be required.

Specifically, in the case where condensation occurs, when the single-sided printing request is issued after the measured current fusing temperature value Tb1 has reached the predetermined target temperature value T0 and before the preparation waiting time NT has elapsed, the anti-condensation control (the print preparation process) is canceled and the single-sided printing process is executed.

Accordingly, execution efficiency of the single-sided printing process is not degraded, since the pending of single-sided printing until the preparation waiting time NT has elapsed is not performed.

When a document reading request corresponding to Cancel Condition 2 (Document Reading Request) is input, only a document reading function (a scanning function) that does not require printing is executed.

Although, in the document reading function, a light source, such as an LED, is turned on to read a document, a light source and the like related to document reading in the image-forming apparatus are considered to be relatively less affected by condensation, and pending of the requested document reading until the preparation waiting time NT elapses is not required when the printing is not involved.

Specifically, in the case where condensation occurs, when the document reading request is input after the measured current fusing temperature value Tb1 has reached the predetermined target temperature value T0 and before the preparation waiting time NT has elapsed, the anti-condensation control (the print preparation process) is canceled and the document reading process is executed.

Accordingly, execution efficiency of the document reading process is not degraded, since the pending of document reading until the preparation waiting time NT has elapsed is not performed.

When a request for shifting to the sleep state corresponding to Cancel Condition 3 (Sleep Shifting Request) is input, the image-forming apparatus saves power and immediate execution of the functions, such as printing, may not be required, and therefore, the anti-condensation control (the print preparation process) is also not required.

On the contrary, it is undesirable to continue the anti-condensation control (the print preparation process) to shift to the sleep state, as this would be a wasteful process.

Specifically, in the case where condensation occurs, when a sleep state shifting request is input after the measured current fusing temperature value Tb1 has reached the predetermined target temperature value T0 and before the preparation waiting time NT has elapsed, the anti-condensation control (the print preparation process) is canceled.

When a case where the door (the panel) of the image-forming apparatus is opened that corresponds to Cancel Condition 4 (Panel Open Operation), for example, the user may open the door (the panel) attached to the image-forming apparatus in order to perform a trouble-shooting operation, such as refilling of printing sheets or removal of a sheet that has been jammed.

Specifically, when the panel is opened, a long period of time is required for the trouble-shooting operation, and therefore, immediate execution of the function, such as printing, may not be required, and therefore, the anti-condensation control (the print preparation process) is also not required. Therefore, in the case where condensation occurs, when the panel of the image-forming apparatus is opened after the measured current fusing temperature value Tb1 has reached the predetermined target temperature value T0 and before the preparation waiting time NT has elapsed, the anti-condensation control (the print preparation process) is canceled.

In a case where an instruction for shifting to a preheating state is issued that corresponds to Cancel Condition 5 (Preheating Shifting Instruction), for example, a state in which a temperature is controlled such that a lowest temperature for printing is attained is entered only by stopping the use of the image-forming apparatus and applying preheating to the fusing device of the image-forming apparatus.

The instruction for shifting to the preheating state is issued when an interruption occurs for a predetermined period of time or when the user manually operates an execution operation.

Specifically, when the preheating state is entered, immediate execution of the function, such as printing, may not be required, and therefore, the anti-condensation control (the print preparation process) is also not required. Specifically, in the case where condensation occurs, when the instruction for shifting to the preheating state is issued after the measured current fusing temperature value Tb1 has reached the predetermined target temperature value T0 and before the preparation waiting time NT has elapsed, the anti-condensation control (the print preparation process) is canceled and a state in which temperature control is performed by preheating is entered.

In a case where shifting by exclusive SIM is requested (Exclusive SIM Shifting Request) that corresponds to Cancel Condition 6, for example, a state in which a service person performs maintenance of the image-forming apparatus is entered.

The exclusive SIM shifting means a change to a special mode that allows various loads to be operated by manual operations performed by the service person.

When this state is entered, immediate execution of the function, such as printing, is not required since it is regarded that maintenance is being performed, and therefore, the anti-condensation control (the print preparation process) is also not required.

Specifically, in the case where condensation occurs, when shifting by the exclusive SIM is requested after the measured current fusing temperature value Tb1 has reached the predetermined target temperature value T0 and before the preparation waiting time NT has elapsed, the anti-condensation control (the print preparation process) is canceled.

FIG. 3A is a diagram illustrating an example of a case where a cancel condition other than the single-sided printing request and the instruction for shifting to the preheating state is met among the conditions for canceling the anti-condensation control (the print preparation process).

As with the second example above, for example, when the user turns on the image-forming apparatus, the anti-condensation control is started and the condensation determiner 24 performs the condensation determination process where the three condensation determination conditions are checked.

Furthermore, also in FIG. 3A, when it is determined that there is a possibility of condensation according to the check of the condensation determination conditions, the print preparation process is started after the preparation waiting time setting process is performed.

In the preparation waiting time setting process, the preparation waiting time NT is set in consideration of the three measured values for the condensation determination.

When the print preparation process is started, the timer for the preparation waiting time NT is activated, and the print preparation process continues even after the measured current fusing temperature value Tb1 has reached the predetermined target temperature value T0.

When a cancel condition is met during the print preparation process, the print preparation process is canceled.

While the print preparation process is being executed, execution of a print job is disabled, and when a cancel condition other than a single-sided printing request and an instruction for shifting to a preheating state is met, the print job inexecutable state preferably remains thereafter.

FIG. 3B is a diagram illustrating an example of the case where an instruction for shifting to a preheating state is issued among the conditions for canceling the anti-condensation control (the print preparation process). Furthermore, a case where a preheating cancel instruction is issued after the preheating process is executed is also illustrated.

Also in FIG. 3B, as with FIG. 3A above, the condensation determiner 24 performs the condensation determination process (the check of the three condensation determination conditions).

When it is determined that there is a possibility of condensation according to the check of the condensation determination conditions, the print preparation process is started after the preparation waiting time setting process is performed so as to set the preparation waiting time NT.

When the print preparation process is started, the timer for the preparation waiting time NT is activated, and the print preparation process continues even after the measured current fusing temperature value Tb1 has reached the predetermined target temperature value T0.

When the cancel condition corresponding to the instruction for shifting to the preheating state is met during the print preparation process, the print preparation process is canceled, a preheating state is entered, and the preheating process is executed.

A print job is inexecutable during the print preparation process and during the preheating process.

However, when a preheating cancel instruction is input by the user, for example, to terminate the preheating process, the preheating process may be terminated before the print job executable state is entered.

When the preheating process is executed for more than a certain period of time, it can be determined that heat has propagated inside the apparatus, and therefore, condensation has been removed. Accordingly, the waiting for the print preparation process is not required to be resumed.

Accordingly, when a double-sided printing request is input after the preheating cancel instruction is issued, for example, a print job of double-sided printing may be executed without pending of the double-sided printing request.

The preheating cancel instruction is issued by an input operation performed by the user, and in addition, the preheating cancel instruction may be automatically input also when a print instruction is received or when a person's approach is detected.

Note that, as described below, although the print preparation process is canceled also when the cancel condition of the single-sided printing request is met, a print job of single-sided printing may be executed.

Fourth Example

Case where Condition for Resuming Anti-Condensation Control (Print Preparation Process) is Met FIG. 4 is a diagram illustrating an example of a case where a condition for resuming the anti-condensation control (the print preparation process) is met.

This section describes a case where, with condensation, the anti-condensation control is started, and a predetermined resume condition is met after a predetermined cancel condition is met in the state in which the anti-condensation control is continued after a measured current fusing temperature value Tb1 has reached the predetermined target temperature value T0.

As described above, when the predetermined cancel condition is met, the anti-condensation control (the print preparation process) is canceled (terminated). However, when the following resume condition is met, the condensation determiner 24 performs the condensation determination process (check of the three condensation determination conditions). When it is determined that condensation may occur, the anti-condensation control (the print preparation process) is resumed.

Note that, when an instruction for shifting to the preheating state is issued among the cancel conditions, the anti-condensation control (the print preparation process) is canceled (terminated). However, as mentioned above, when an instruction for canceling the preheating state is issued, the anti-condensation control (the print preparation process) is not resumed.

The following conditions are listed as the conditions for resuming the anti-condensation control.

Resume Condition 1 (Document Reading Cancel Request): A case where a document reading cancel request is input.

Resume Condition 2 (Sleep Restoration Request): A case where a request for restoration from a sleep state to a normal operation state is input.

Resume Condition 3 (Panel Closing Operation): A case where the panel of the image-forming apparatus is closed.

Resume Condition 4 (Exclusive SIM Restoration Request): A case where restoration by exclusive SIM is requested.

In a case where a document reading cancel request corresponding to Resume Condition 1 (Document Reading Cancel Request) is input, execution of the document reading function (a scanning function) that does not require printing is terminated.

After the execution of the document reading function (the scanning function) is terminated, the condensation determination process is performed to check whether a print job is executable, and when it is determined that condensation may be occurring, the anti-condensation control (the print preparation process) is resumed.

When it is determined that there is no possibility of condensation, a print job executable state is entered without executing the anti-condensation control (the print preparation process).

In a case where a request for restoration from a sleep state to a normal operation state is input that corresponds to Resume Condition 2 (Sleep Restoration Request), the condensation determination process is performed before the restoration to the normal operation state, and when it is determined that there is a possibility of condensation, the anti-condensation control (the print preparation process) is resumed.

When it is determined that there is no possibility of condensation, a print job executable state is entered without executing the anti-condensation control (the print preparation process).

In a case where the panel of the image-forming apparatus is closed that corresponds to Resume Condition 3 (Panel Closing Operation), for example, the user may have finished refilling printing sheets or trouble-shooting.

Accordingly, the condensation determination process is performed to check whether restoration to the normal operation state may be performed, and when it is determined that there is a possibility of condensation, the anti-condensation control (the print preparation process) is resumed.

When it is determined that there is no possibility of condensation, a print job executable state is entered without executing the anti-condensation control (the print preparation process).

In a case where a request for restoration by exclusive SIM is issued that corresponds to Resume Condition 4 (Exclusive SIM Restoration Request), for example, automatic rebooting of the control system, resuming of the print preparation process, and other processes are executed.

When this process is executed, the condensation determination process is performed to determine whether restoration to the normal operation state may be performed, and when it is determined that there is a possibility of condensation, the anti-condensation control (the print preparation process) is resumed.

When it is determined that there is no possibility of condensation, a print job executable state is entered without executing the anti-condensation control (the print preparation process).

In FIG. 4, in a case where it is determined that there is a possibility of condensation and the anti-condensation control (the print preparation process) is being executed, when a condition for canceling the anti-condensation control (the print preparation process) is met, the print preparation process is canceled.

Thereafter, when the resume condition as described above is met, the condensation determination process is performed to determine whether there is a possibility of condensation so that it is determined whether restoration to the normal operation state may be performed.

When it is determined that there is a possibility of condensation according to the check of the condensation determination conditions, the print preparation process is resumed after the preparation waiting time setting process is performed.

In the preparation waiting time setting process, the preparation waiting time NT is set in consideration of the three measured values for the condensation determination, and then the timer for the preparation waiting time NT is activated and the print preparation process is started.

Even after the print preparation process is resumed, the print job inexecutable state remains, in principle, until the timer for the preparation waiting time NT times out and the print preparation process is terminated.

Fifth Example

Case where Single-Sided Printing is Requested with Condensation

Figure 6:
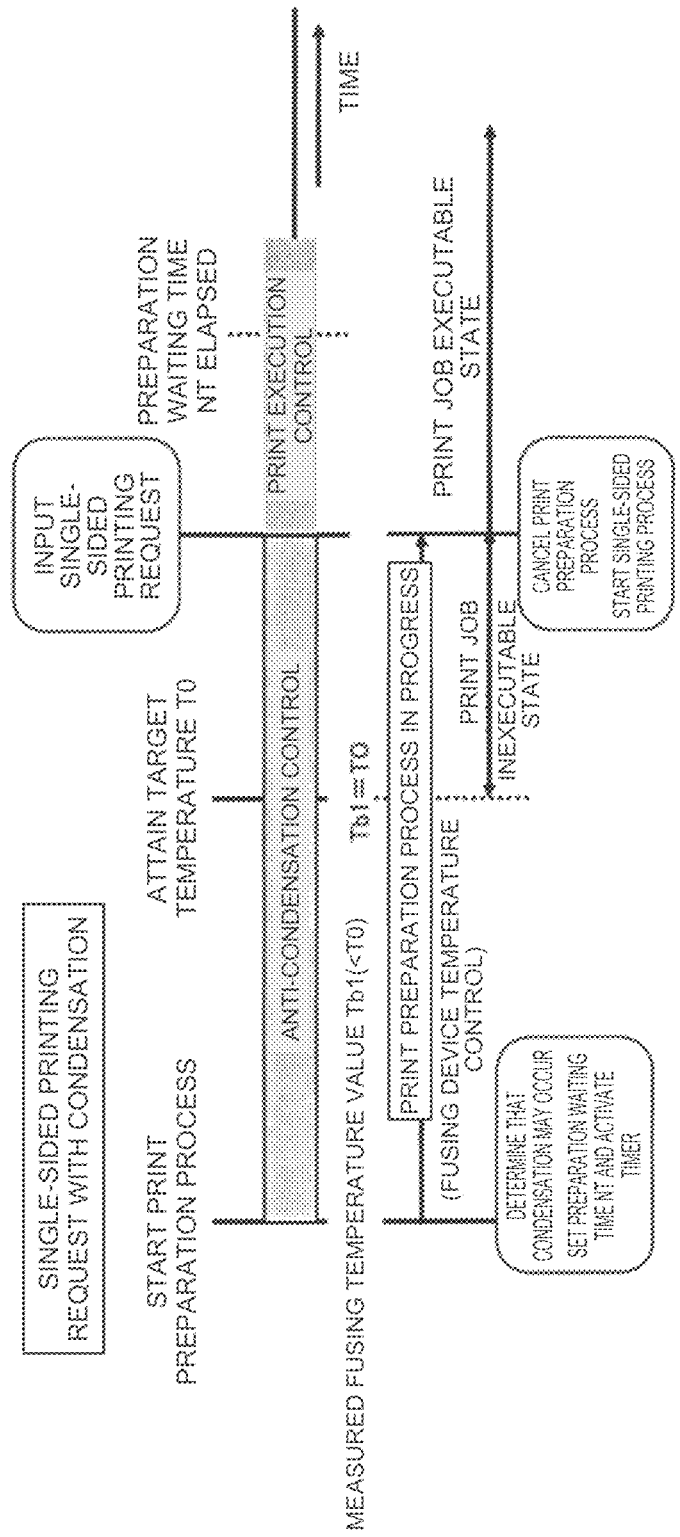
FIG. 6 is a diagram illustrating an example of a case where a single-sided printing request is issued while the anti-condensation control (the print preparation process) is performed with condensation according to the present disclosure.

FIG. 6 is a diagram illustrating an example of a case where, with condensation, a single-sided printing request is issued while the anti-condensation control (the print preparation process) is performed. Here, this corresponds to the case where a single-sided printing request is input among the cancel conditions described above.

In the case where it is determined that there is a possibility of condensation and a single-sided printing request is input after the measured current fusing temperature value Tb1 becomes equal to or larger than the target temperature value T0 and before the preparation waiting time NT has elapsed while the anti-condensation control (the print preparation process) is being performed, the anti-condensation control (the print preparation process) is canceled and the single-sided printing is executed.

In FIG. 6, as with the second example above, for example, when the user turns on the image-forming apparatus, the anti-condensation control is started and the condensation determiner 24 performs the condensation determination process where the three condensation determination conditions are checked.

Also in FIG. 6, when it is determined that there is a possibility of condensation according to the check of the condensation determination conditions, the print preparation process is started after the preparation waiting time setting process is performed.

In the preparation waiting time setting process, the preparation waiting time NT is set in consideration of the three measured values for the condensation determination.

When the print preparation process is started, the timer for the preparation waiting time NT is activated, and the print preparation process continues even after the measured current fusing temperature value Tb1 has reached the predetermined target temperature value T0.

In principle, the print job inexecutable state is maintained during the print preparation process. However, when a single-sided printing request is input in a period of time before the preparation waiting time NT elapses, the print preparation process is canceled even when the preparation waiting time NT does not elapse, and the single-sided printing process is started. Specifically, when a single-sided printing request is input, the print job executable state is entered.

This is because condensation is unlikely to adversely affect print quality of an image of the single-sided printing even when the single-sided printing process is executed after the measured current fusing temperature value Tb1 has reached the predetermined target temperature value T0.

Therefore, when the single-sided printing request is input after the measured current fusing temperature value Tb1 has reached the predetermined target temperature value T0 and before the preparation waiting time NT has elapsed, the print preparation process is forcibly canceled and the single-sided printing process is executed. Accordingly, as for the single-sided printing process, the user does not require to wait until the preparation waiting time NT has elapsed, and the single-sided printing may be efficiently executed.

Sixth Example

Case where Double-Sided Printing is Requested with Condensation

Figure 7:
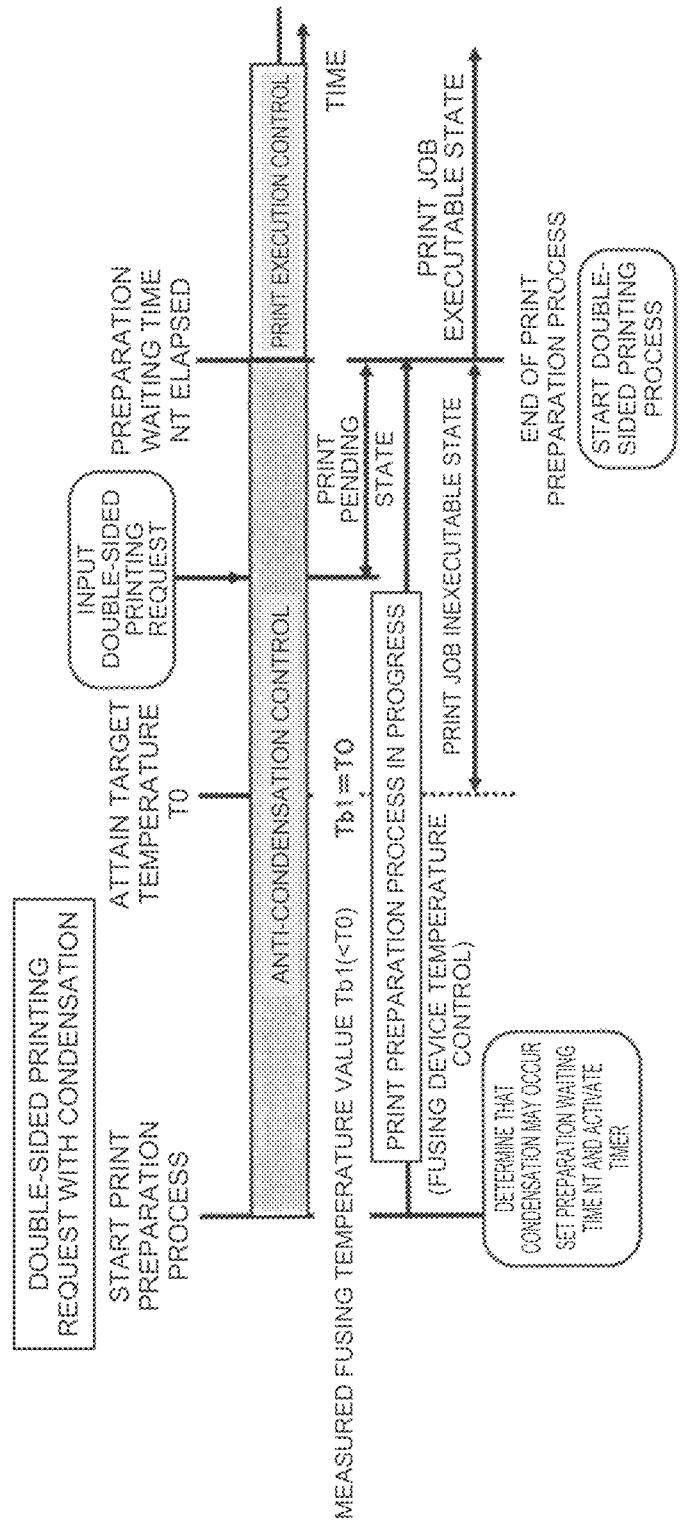
FIG. 7 is a diagram illustrating an example of a case where a double-sided printing request is issued while the anti-condensation control (the print preparation process) is performed with condensation according to the present disclosure.

FIG. 7 is a diagram illustrating a case where, with condensation, a double-sided printing request is issued while the anti-condensation control (the print preparation process) is performed.

This section shows a process performed when a double-sided printing request is input before the preparation waiting time NT has elapsed.

In the case where it is determined that there is a possibility of condensation and a double-sided printing request is input after the measured current fusing temperature value Tb1 becomes equal to or larger than the target temperature value T0 and before the preparation waiting time NT has elapsed while the anti-condensation control (the print preparation process) is being performed, the double-sided printing request is pending.

When the preparation waiting time NT has elapsed, the anti-condensation control (the print preparation process) is terminated and the double-sided printing is started.

As described above, when the double-sided printing is performed, a printing sheet is guided to an inversion path after one side (a front side) of the printing sheet is printed. However, when condensation occurs, the printing sheet absorbs water during conveyance to the inversion path, and image quality may be degraded when printing on the other side (a back side) of the sheet is performed.

Therefore, to sufficiently eliminate condensation and prevent image quality degradation in the double-sided printing, a period of time for the anti-condensation control (the print preparation process) is extended, and the double-sided printing is started after the preparation waiting time NT has elapsed.

In FIG. 7, as with the second example above, for example, when the user turns on the image-forming apparatus, the anti-condensation control is started and the condensation determiner 24 performs the condensation determination process where the three condensation determination conditions are checked.

Also in FIG. 7, when it is determined that there is possibility of condensation in the check of the condensation determination conditions, the print preparation process is started after the preparation waiting time setting process is performed.

In the preparation waiting time setting process, the preparation waiting time NT is set in consideration of the three measured values for the condensation determination.

When the print preparation process is started, the timer for the preparation waiting time NT is activated, and the print preparation process continues even after the measured current fusing temperature value Tb1 has reached the predetermined target temperature value T0.

In principle, since the print job inexecutable state is maintained during the print preparation process, when a double-sided printing request is input before the preparation waiting time NT elapses, the double-sided printing request is pending until the preparation waiting time NT has elapsed. Here, the print request information 45 associated with the double-sided printing request is stored as print pending information 46.

Therefore, the print preparation process is executed until the preparation waiting time NT elapses, and when the preparation waiting time NT has elapsed, the print preparation process is terminated. Thereafter, the double-sided printing process which has been pending is started.

Thus, when it is determined that there is a possibility of condensation, a period of time in which the print preparation process is executed is extended, and the print preparation processing is performed until the extended preparation waiting time NT has elapsed so that the condensation is sufficiently removed before the double-sided printing is started. Accordingly, degradation of image quality in the double-sided printing can be suppressed.

Seventh Example

Figure 8:
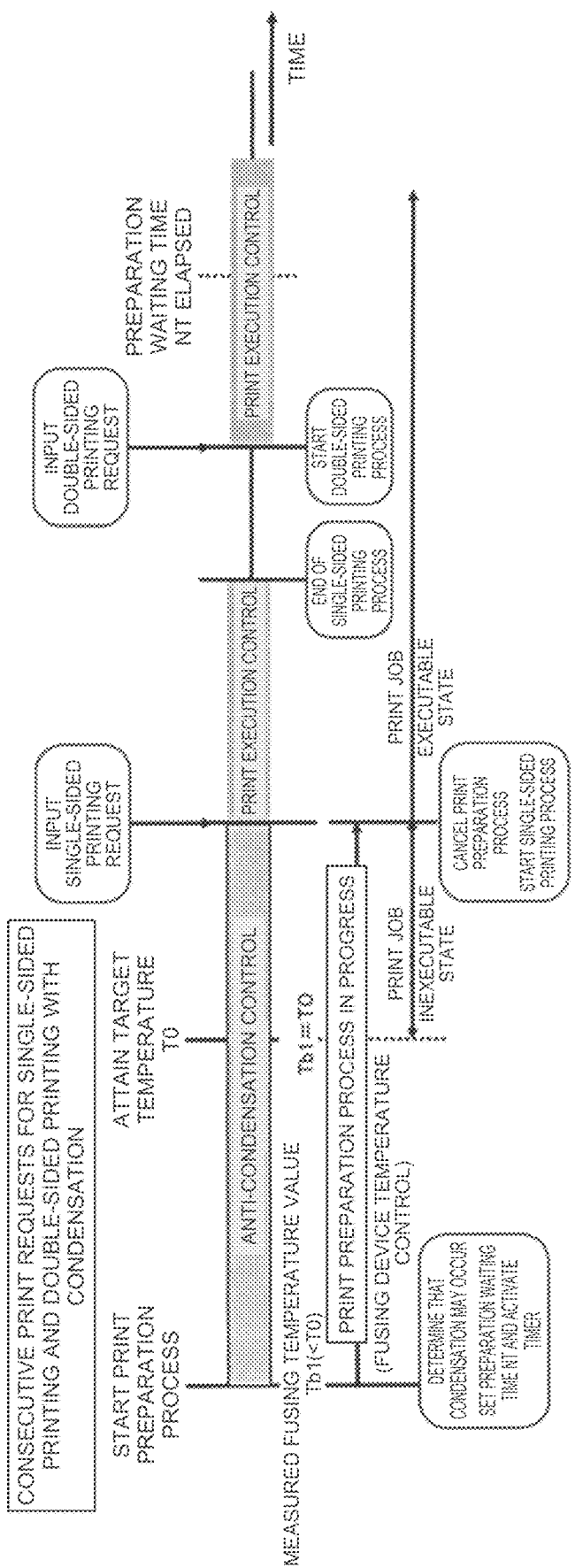
FIG. 8 is a diagram illustrating an example of a case where a single-sided printing request and a double-sided printing request are issued while the anti-condensation control (the print preparation process) is performed with condensation according to the present disclosure.

Case where Single-Sided Printing Request and Double-Sided Printing Request are Issued with Condensation FIG. 8 is a diagram illustrating an example of a case where a single-sided printing request and a double-sided printing request are issued while the anti-condensation control (the print preparation process) is performed when condensation occurs.

This section shows a process performed when a single-sided printing request and a double-sided printing request are consecutively input before the preparation waiting time NT has elapsed.

As mentioned above, when a single-sided printing request is issued before the preparation waiting time NT has elapsed, the single-sided printing request is not pending and the single-sided printing is executed.

A certain period of time is required for the single-sided printing process, and therefore, the preparation waiting time NT may terminated when the single-sided printing process is terminated.

Furthermore, when the single-sided printing is executed, a temperature around the fusing device and the photoreceptor may rise due to the single-sided printing process, and therefore, condensation may be removed before the preparation waiting time NT has elapsed.

Therefore, when a single-sided printing request is issued followed by the double-sided printing request during the anti-condensation control (the print preparation process), the double-sided printing is executed after the single-sided printing process is terminated and even before the preparation waiting time NT elapses.

In FIG. 8, the same process as in FIG. 6 is performed until a single-sided printing request is input.

Specifically, in FIG. 8, when the user turns on the image-forming apparatus, for example, the anti-condensation control is started and the condensation determiner 24 performs the condensation determination process where the three condensation determination conditions are checked.

Also in FIG. 8, when it is determined that there is a possibility of condensation according to the check of the condensation determination conditions, the print preparation process is started after the preparation waiting time setting process is performed.

In the preparation waiting time setting process, the preparation waiting time NT is set in consideration of the three measured values for the condensation determination.

When the print preparation process is started, the timer for the preparation waiting time NT is activated, and the print preparation process continues even after the measured current fusing temperature value Tb1 has reached the predetermined target temperature value T0.

In principle, the print job inexecutable state is maintained during the print preparation process. However, when a single-sided printing request is input in a period of time before the preparation waiting time NT elapses, the print preparation process is canceled even when the preparation waiting time NT does not elapse, and the single-sided printing process is started.

Thereafter, when a certain period of time has elapsed after the single-sided printing process is started, the single-sided printing process is terminated.

As illustrated in FIG. 8, when the double-sided printing request is input after the single-sided printing process is terminated and before the preparation waiting time NT elapses, the double-sided printing process is started since the measured current fusing temperature value Tb1 has reached the predetermined target temperature value T0 before the single-sided printing process is executed.

Furthermore, when the double-sided printing request is input before the single-sided printing process is terminated and before the preparation waiting time NT elapses, the double-sided printing request is pending until the single-sided printing process is terminated, and then, the double-sided printing process is started after the single-sided printing process is terminated.

Accordingly, even in a case where there is a possibility of condensation, when a single-sided printing request and a double-sided printing request are consecutively input in this order, a double-sided printing process may be more quickly started before the preparation waiting time NT elapses, and degradation of image quality in the double-sided printing caused by the condensation may be suppressed.

Figure 10:
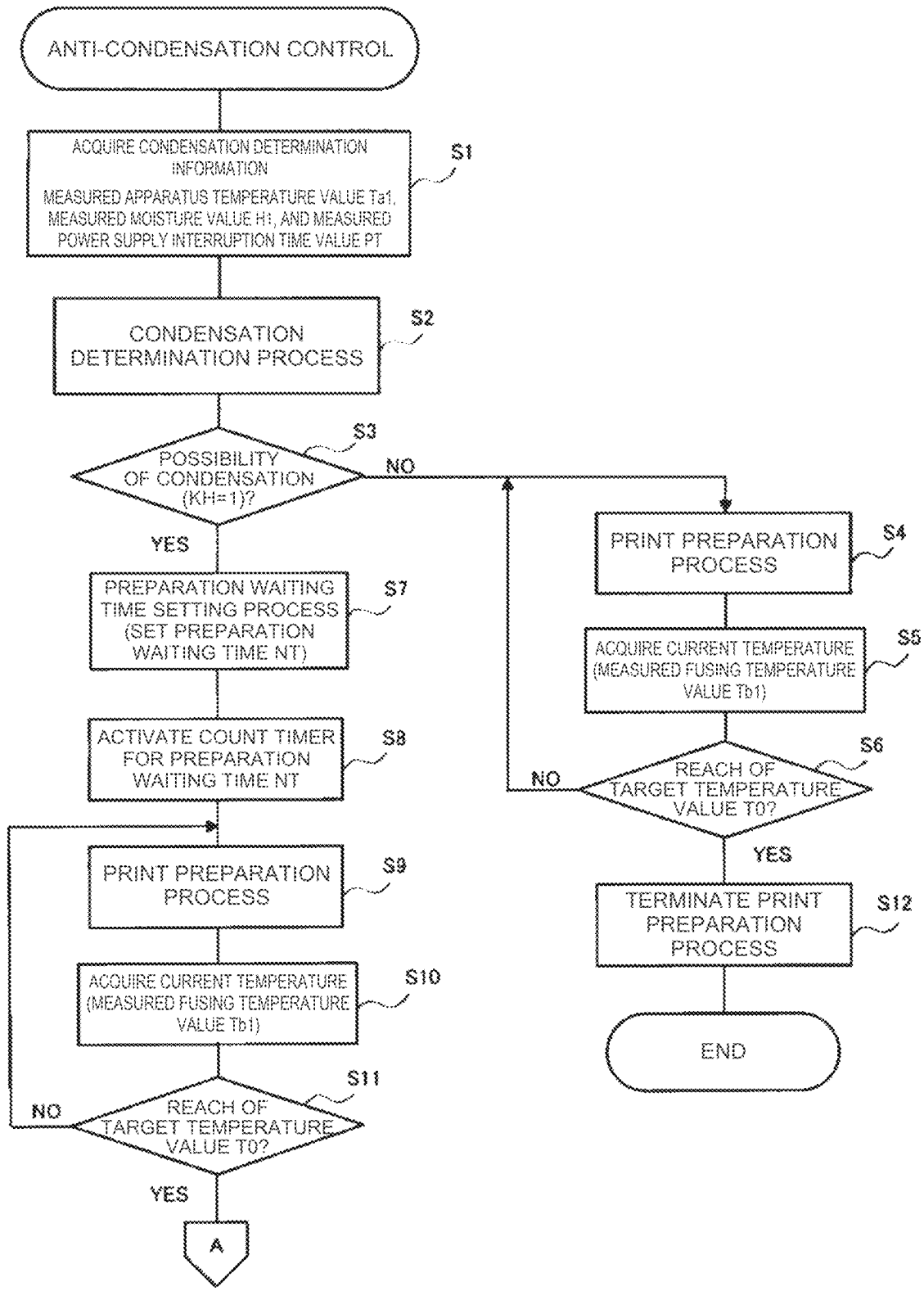
FIG. 10 is a flowchart of an example of an anti-condensation control process according to the present disclosure.
Figure 11:
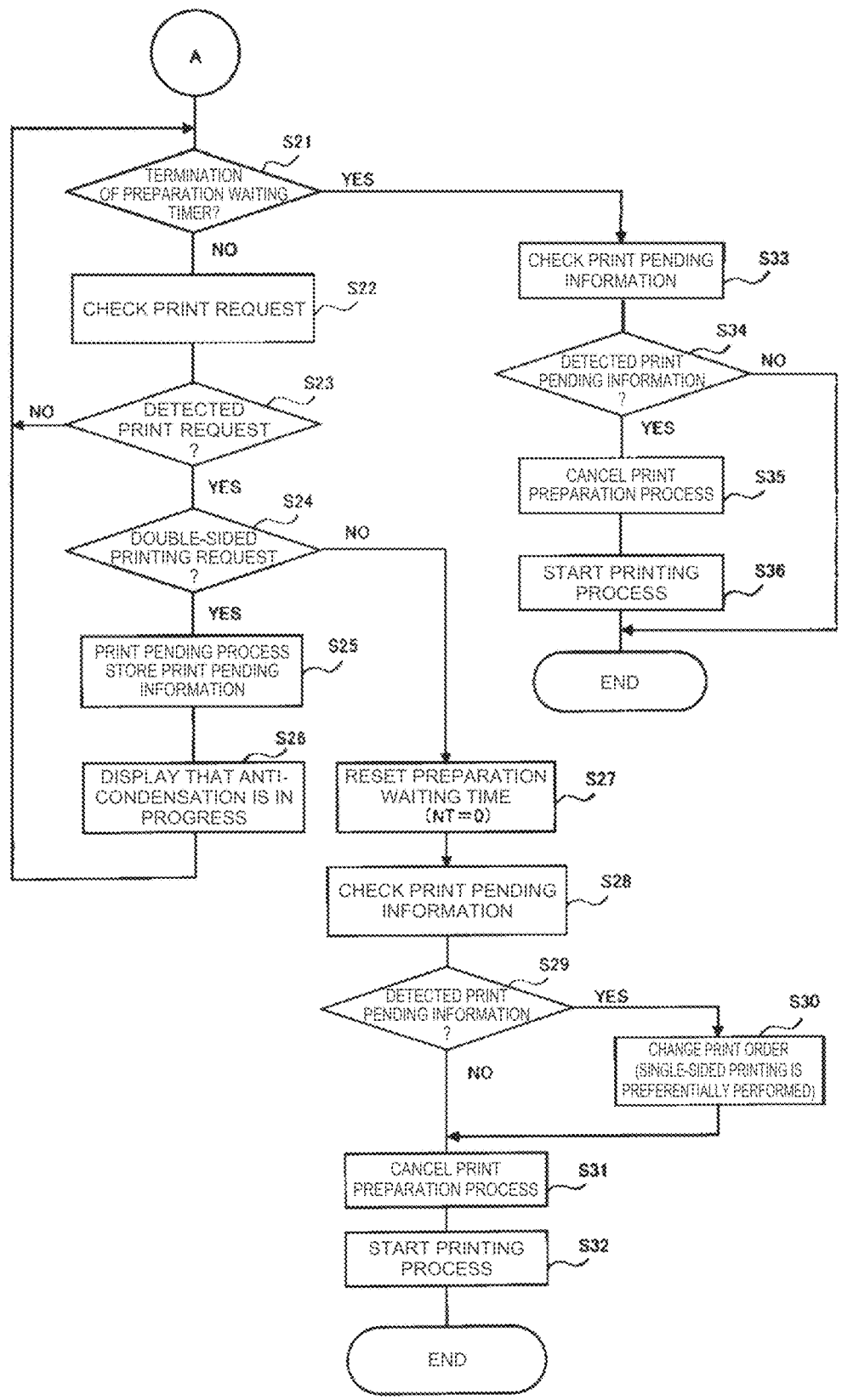
FIG. 11 is the flowchart of the example of the anti-condensation control process according to the present disclosure.

Flowchart of Anti-Condensation Control (Print Preparation Process) Main Flowchart of Anti-Condensation Control FIGS. 10 and 11 show a main flowchart of an example of anti-condensation control.

This main flowchart does not take into account the cancel conditions described above.

The anti-condensation control is started when the user turns on the image-forming apparatus or when the image-forming apparatus is restored to the normal operation state from the sleep state.

In step S1 of FIG. 10, condensation determination information is obtained.

Here, the measured apparatus temperature value Ta1 is obtained by the apparatus temperature sensor 21a, the measured moisture values H1 is obtained by the hygrometer 22, and the measured power supply interruption time value PT is obtained by the power supply interruption timer 23.

In step S2, the condensation determiner 24 performs the condensation determination process.

In the condensation determination process, it is determined whether there is a possibility of condensation using the measured apparatus temperature value Ta1, the measured moisture value H1, the measured power supply interruption time value PT, and the condensation determination condition information 48 (Th, Hh, and Ph).

When it is determined, in the condensation determination, that there is a possibility of condensation, 1 is set to the condensation determination result (KH) 51, and otherwise, 0 is set to the condensation determination result (KH) 51.

A detailed flowchart of the condensation determination process in step S2 will be described hereinafter with reference to FIG. 12.

In step S3, when the condensation determination result indicates "there is a possibility of condensation (KH=1)", the process proceeds to step S7, and when the result indicates "there is no possibility of condensation (KH=0)", the process proceeds to step S4.

In step S4, since there is no possibility of condensation, the print preparation process is started without setting the preparation waiting time.

As described above, in the print preparation process, the heater is heated so that temperatures of the components of the image-forming apparatus are raised, and therefore, condensation does not occur. Accordingly, the functions of the image-forming apparatus can be normally executed.

When the print preparation process has already been started, the print preparation process is continued as is.

In step S5, a current fusing temperature (a measured fusing temperature value Tb1) is obtained by the fusing temperature sensor 21b. In step S6, it is determined whether the current fusing temperature (the measured fusing temperature value Tb1) has reached the target temperature value T0, and when the determination is negative (Tb1<T0), the process returns to step S4 where the print preparation process is continued.

On the other hand, when the current fusing temperature (the measured fusing temperature value Tb1) has reached the target temperature value T0 (Tb1≥T0), the process proceeds to step S12 where the print preparation process is terminated, and then the flowchart is terminated.

In step S7, the preparation waiting time setter 26 performs the preparation waiting time setting process.

In the preparation waiting time setting process, the preparation waiting time NT is set using the measured apparatus temperature value Ta1, the measured moisture value H1, the measured power supply interruption time value PT, the extension reference time N0, and the correction values thereof (KA, KB, and KC).

A detailed flowchart of the preparation waiting time setting process in step S7 will be described hereinafter with reference to FIG. 13.

Note that, when the lifetime of the image-forming apparatus is taken into consideration, the flowchart in FIG. 14 described below may be used instead of FIG. 13.

In step S8, a timer is activated to count the elapse of the set preparation waiting time NT.

The print preparation process is continued until the preparation waiting time NT has elapsed, unless at least one of the cancel conditions is met.

In step S9, as with step S4, the print preparation process is started. When the print preparation process has already been started, the print preparation process is continued while the timer is operated.

In step S10, as with step S5, a current fusing temperature (a measured fusing temperature value Tb1) is obtained by the fusing temperature sensor 21b.

In step S11, as with step S6, it is determined whether the current fusing temperature (the measured fusing temperature value Tb1) has reached the target temperature value T0, and when the determination is negative (Tb1<T0), the process returns to step S9 where the print preparation process is continued.

On the other hand, when the current fusing temperature (the measured fusing temperature value Tb1) has reached the target temperature value T0 (Tb1≥T0), the process proceeds to step S21 in FIG. 11.

In step S21 of FIG. 11, when the timer counting the preparation waiting time NT is checked and the timer expires, that is, when the preparation waiting time NT has elapsed after the print preparation process is started, the process proceeds to step S33, and otherwise, the process proceeds to step S22.

In step S22, the print request checker 28 determines whether a print request has been issued.

Here, for example, it is determined whether an input operation that implies a print request has been performed on the image-forming apparatus.

When the print request has been issued, information indicating the number of copies and the like set before the print request is issued is stored as the print request information 45.

In step S23, when the print request has been issued, the process proceeds to step S24, and otherwise, the process returns to step S21.

In step S24, when the print request has been issued, content of settings of the print request is checked, and when a setting of a print side indicates "double-sided printing", the process proceeds to step S25, whereas when the setting of a print side indicates "single-sided printing", the process proceeds to step S27.

In step S25, since the preparation waiting time NT has not yet elapsed, a print pending process is performed.

Here, the setting content stored in the print request information 45 is stored as the print pending information 46.

A print job with "double-sided printing" being set is pending, whereas a print job with "single-sided printing" being set is not pending.

In step S26, the user who made the print request using the image-forming apparatus is informed that the requested double-sided printing job is currently pending.

For example, "anti-condensation is being performed," "printing is pending due to anti-condensation," "printing is being prepared and is automatically started when ready," etc. are displayed on the display 13 to notify the user that the print job is currently pending.

After step S26, the process returns to step S21.

When the job of the print request indicates "single-sided printing," a printing process is performed without waiting elapse of the preparation waiting time NT, and therefore, the preparation waiting time NT is reset (NT=0) and the timer is stopped in step S27.

In step S28, the print pending information 46 is checked to determine whether there is a pending print job.

In step S29, when the print pending information 46 includes a print job, the process proceeds to step S30, and otherwise, the process proceeds to step S31.

In step S30, print order is changed to give priority to "single-sided printing".

Specifically, the print order is changed such that the print job of "single-sided printing" is printed first, and after the printing of the print job of "single-sided printing", the pending print job of "double-sided printing" is printed.

When the print pending information 46 includes a print job, the pending print job corresponds to "double-sided printing", and therefore, when the pending job of "double-sided printing" is printed in a state in which the preparation waiting time NT has not elapsed, image quality may be degraded.

Therefore, in the state in which the preparation waiting time NT has not been elapsed, it is preferable that printing of the print job of "single-sided printing" that is considered to be less affected by condensation is performed first, and after the printing of the print job of "single-sided printing" is terminated, printing of the pending job of "double-sided printing" is performed.

Since the printing of the print job of "double-sided printing" is performed after the printing of the print job of "single-sided printing", degradation in print quality can be suppressed in the printing of the pending print job of "double-sided printing".

Furthermore, also when a plurality of print jobs of "double-sided printing" are pending in the print pending information 46, print order is changed such that the printing of the print job of "single-sided printing" is performed first, and after the printing of the print job of "single-sided printing" is terminated, printing of the plurality of pending print jobs of "double-sided printing" is performed.

After step S30, the process proceeds to step S31.

In step S31, the print preparation process is canceled.

In step S32, a printing process is started.

Here, when there is no pending print job of "double-sided printing", only the printing of the print job of "single-sided printing" is performed.

Specifically, when there is a pending print job of "double-sided printing", printing of the print job of "single-sided printing" is performed, and after the printing of the print job of "single-sided printing" is terminated, printing of the print job of "double-sided printing" is performed.

After printing of all print jobs requested to be printed has been terminated in step S32, the flowchart is terminated.

When the preparation waiting time NT has elapsed, it is considered that either "single-sided printing" or "double-sided printing" does not cause degradation in image quality since the anti-condensation has been sufficiently performed. Specifically, after the preparation waiting time NT has elapsed, "double-sided printing" is ready to be executed.

In step S33, as with step S28, the print pending information 46 is checked to determine whether there is a pending print job.

In step S34, when the print pending information 46 includes a print job, the process proceeds to step S35, and otherwise, the flowchart is terminated.

In step S35, as with step S31, the print preparation process is canceled.

In step S36, the printing process for the pending print job of "double-sided printing" is started.

In step S36, the flowchart is terminated after printing of all the pending print jobs of "double-sided printing" is terminated.

Flowchart of Condensation Determination Process: Step S2

Figure 12:
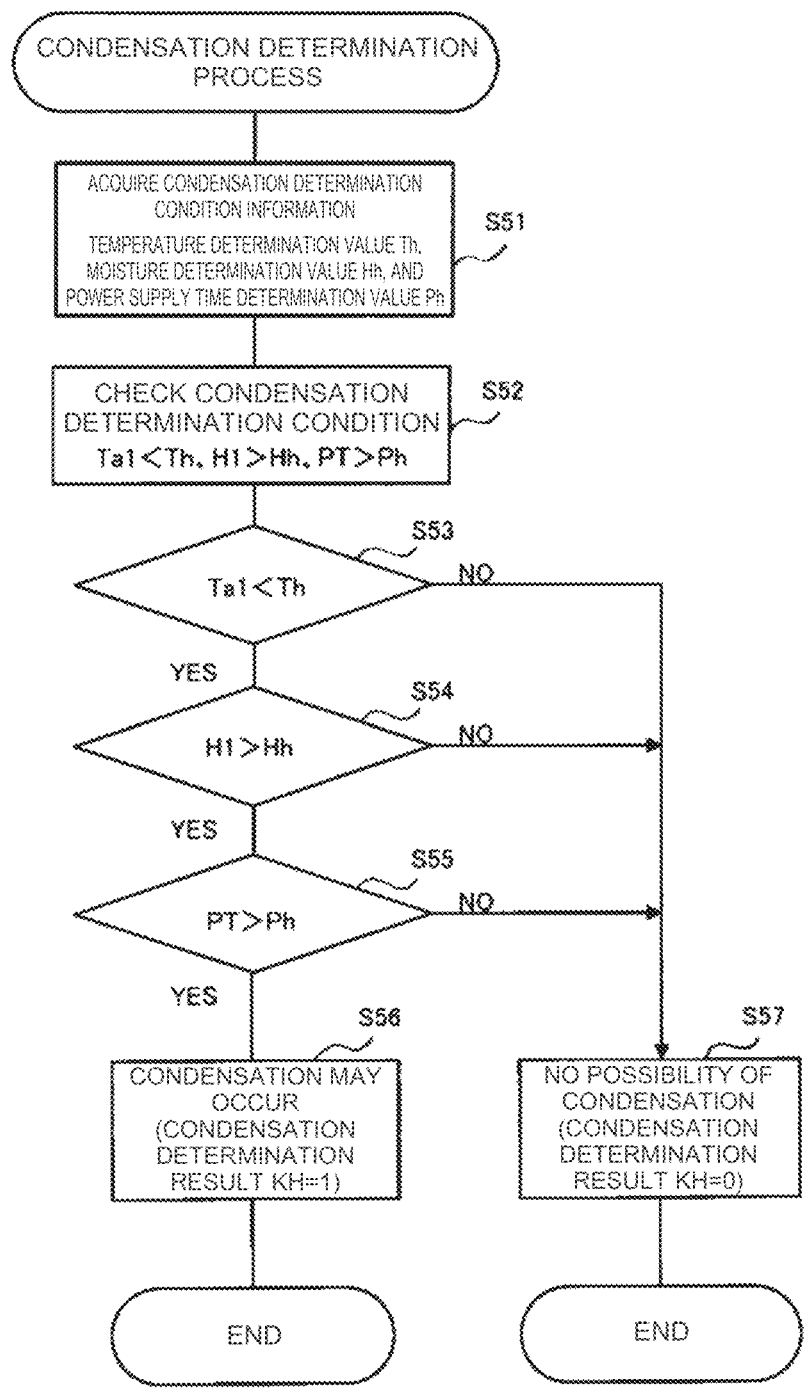
FIG. 12 is a flowchart of an example of a condensation determination process according to the present disclosure.

FIG. 12 is a flowchart of an example of the condensation determination process.

The condensation determination process is executed in step S2 of FIG. 10 as described above.

In step S51 of FIG. 12, the condensation determination condition information 48 is acquired from the storage 40.

Specifically, the temperature determination value Th, the moisture determination value Hh, and the power supply time determination value Ph, which are stored in advance in the storage 40, are read.

In step S52, the condensation determination condition is checked. Here, in order to check whether it is determined that there is a possibility of condensation, the measured apparatus temperature value Ta1, the measured moisture value H1, and the measured power supply interruption time value PT that have been already acquired are compared with corresponding values in the condensation determination condition information 48.

In other words, it is determined whether the following conditions are met: Ta1<Th, H1>Hh, and PT>Ph.

In step S53, when "Ta1<Th" is satisfied, the process proceeds to step S54, and otherwise, proceeds to step S57.

In step S54, when "H1>Hh" is satisfied, the process proceeds to step S55, and otherwise, proceeds to step S57.

In step S55, when "PT>Ph" is satisfied, the process proceeds to step S56, and otherwise, proceeds to step S57.

Accordingly, when all the three conditions Ta1<Th, H1>Hh, and PT>Ph are met, it is determined that condensation may be occurring, and the process proceeds to step S56.

Furthermore, when at least one of the three conditions is not met, it is determined that there is no possibility of condensation occurring and the process proceeds to step S57.

In step S56, it is determined that there is a possibility of condensation, and information indicating "possibility of condensation" is set as the condensation determination result KH (KH=1).

In step S57, it is determined that there is no possibility of condensation, and information indicating "no possibility of condensation" is set as the condensation determination result KH (KH=0).

After step S56 or step S57, the process is terminated, and proceeds to step S3 of FIG. 10.

Flowchart of Preparation Waiting Time Setting Process: Step S7)

Figure 13:
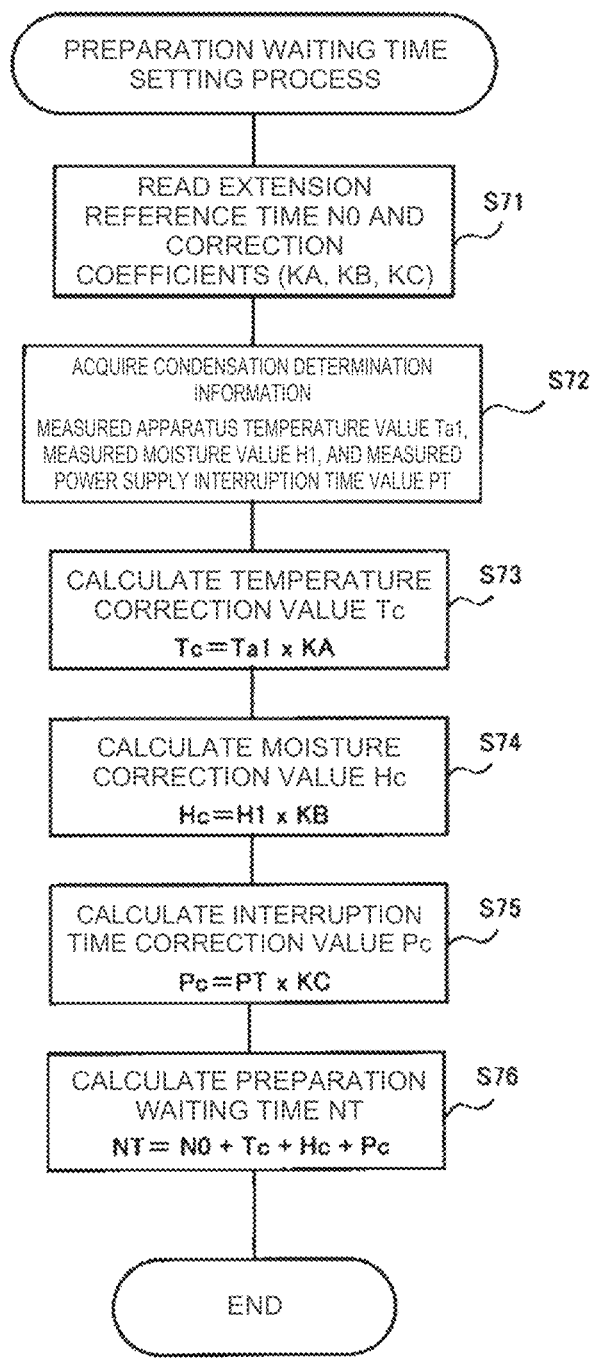
FIG. 13 is a flowchart of an example of a preparation waiting time setting process according to the present disclosure.

FIG. 13 is a flowchart of an example of the preparation waiting time setting process.

The flowchart in FIG. 13 is used to set the preparation waiting time NT without taking the lifetime of the image-forming apparatus into consideration.

The preparation waiting time setting process is executed in step S7 in FIG. 10 described above.

In step S71 of FIG. 13, information used to set the preparation waiting time NT is read from the storage 40.

As described above, as the information used to set the preparation waiting time NT, the extension reference time N0 and the correction coefficients (the temperature correction coefficient KA, the moisture correction coefficient KB, and the power supply interruption time correction coefficient KC) are stored in advance, and the information is read from the storage 40.

The individual correction coefficients are used to convert the corresponding measured values (Ta1, H1, and PT) into respective numerical values corresponding to periods of time.

In step S72, as with step S1 of FIG. 10, condensation determination information is acquired.

Specifically, the measured apparatus temperature value Ta1 is obtained by the apparatus temperature sensor 21a, the measured moisture values H1 is obtained by the hygrometer 22, and the measured power supply interruption time value PT is obtained by the power supply interruption timer 23.

In step S73, the temperature correction value Tc is calculated by Tc=Ta1×KA, using the measured apparatus temperature value Ta1 and the temperature correction coefficient KA.

In step S74, the moisture correction value Hc is calculated by Hc=H1×KB, using the measured moisture value Ta1 and the moisture correction coefficient KB.

In step S75, the interruption time correction value Pc is calculated by Pc=PT×KC, using the measured power supply interruption time value PT and the power supply interruption time correction coefficient KC.

In step S76, the preparation waiting time NT is calculated by NT=N0+Tc+Hc+Pc, using the extension reference time N0 and the three correction values (Tc, Hc, and Pc).

After step S76, the process is terminated, and proceeds to step S8 of FIG. 10.

Flowchart of Preparation Waiting Time Setting Process in Consideration of Lifetime: Step S7)

Figure 14:
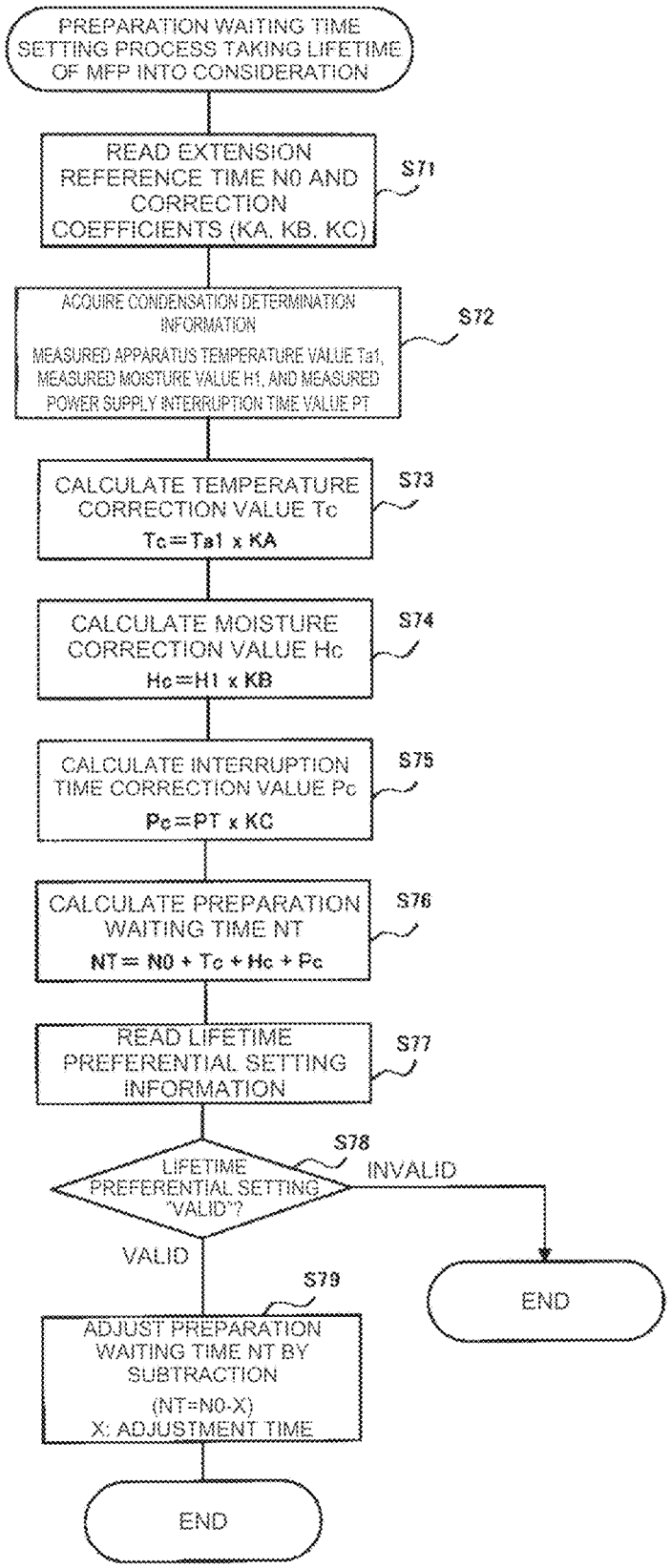
FIG. 14 is a flowchart of an example of a preparation waiting time setting process taking a lifetime of the image-forming apparatus into consideration according to the present disclosure.

FIG. 14 is a flowchart of an example of a preparation waiting time setting process taking a lifetime of the image-forming apparatus into consideration. The flowchart in FIG. 14 is used in step S7 of FIG. 10 described above to set the preparation waiting time NT taking the lifetime of the image-forming apparatus into consideration.

When "valid (1)" is set as the lifetime preferential setting information 47, the preparation waiting time NT is controlled by subtraction in consideration of the lifetime of the image-forming apparatus.

A control time X for subtractive control described below may be set by multiplying a use time MT of the image-forming apparatus to date by a predetermined coefficient K (X=MT×K) or may be set and stored in a fixed manner in advance.

In steps of FIG. 14, the same numbers as those in FIG. 13 are applied to steps for performing the same processes as those illustrated in FIG. 14. In FIG. 14, from step S71 to step S76, the same process as in FIG. 13 is performed.

Specifically, the three correction values (Tc, Hc, and Pc) are calculated using the condensation determination information (Ta1, H1, and PT) and the correction coefficients (KA, KB, and KC), and the extension reference time N0 and the three correction values (Tc, Hc, and Pc) are added to obtain the preparation waiting time NT.

In step S77, the lifetime preferential setting information 47 is read from the storage 40.

In step S78, when content of the setting of the lifetime preferential setting information 47 is "valid (1)", the process proceeds to step S79.

On the other hand, when content of the setting of the lifetime preferential setting information 47 is "invalid (0)," the process is terminated and proceeds to step S8 of FIG. 10.

In step S79, the preparation waiting time NT is controlled by subtraction using the predetermined control time X.

For example, the use time MT of the image-forming apparatus to date is acquired and a numerical value obtained by multiplying the use time MT by the predetermined coefficient K is set as the control time X (X=MT×K).

The use time MT of the image-forming apparatus to date is an actual operating time (an actual working time) of the image-forming apparatus. For example, after initial installation of the image-forming apparatus, a period of time T in which power is always on is measured, and a numerical value obtained by counting up the period of time T to date corresponds to the use time MT.

The preparation waiting time NT is calculated by NT=N0·X using the extension reference time N0 and the control time X.

In this case, the preparation waiting time NT is reduced by an amount of the control time X.

After step S79, the process is terminated, and proceeds to step S8 of FIG. 10.

What is claimed is:

1. An image-forming apparatus having a printing function, comprising:
    an apparatus temperature sensor that measures an apparatus temperature inside the image-forming apparatus;
    a condensation determiner that determines whether a possibility of condensation occurring inside the image-forming apparatus exists using predetermined condensation determination information including the measured apparatus temperature;
    a fusing temperature sensor that measures a fusing temperature of a fusing device;
    a target temperature determiner that determines whether the measured fusing temperature has reached a predetermined target temperature;
    a preparation processor that performs a preparation process for executing the printing function; and
    a preparation waiting time setter that sets a preparation waiting time indicating a period of time in which the preparation process is performed, wherein
    when the image-forming apparatus is powered, the apparatus temperature sensor measures a current apparatus temperature,
    when the condensation determiner determines that the possibility of condensation occurring inside the image-forming apparatus exists, the preparation waiting time setter sets the preparation waiting time using the predetermined condensation determination information,
    when an indication for performing the preparation process is received, the preparation processor starts the preparation process,
    after counting of the preparation waiting time starts at a beginning of the preparation process, the fusing temperature sensor periodically measures a current fusing temperature, and
    after the target temperature determiner determines that the currently measured fusing temperature has reached the predetermined target temperature and when the counted preparation waiting time has elapsed, the preparation processor cancels the preparation process.

2. The image-forming apparatus according to claim 1, further comprising:
    a print request checker that determines whether a print request was issued to start the print function, wherein
    when the condensation determiner determines that the possibility of condensation occurring inside the image-forming apparatus exists, and
    when the print request checker determines that a print request for single-sided printing was issued, and after the target temperature determiner determines that the currently measured fusing temperature has reached the predetermined target temperature, the preparation processor cancels the preparation process before the preparation waiting time elapses, such that the print request for the single-sided printing is executed.

3. The image-forming apparatus according to claim 1, further comprising:
    a print request checker that determines whether a print request was issued to start the print function; and
    a print pending processor that suspends a print job corresponding to the print request, wherein
    when the condensation determiner determines that the possibility of condensation occurring inside the image-forming apparatus exists, and
    when the print request checker determines that a print request for double-sided printing was issued, and after the target temperature determiner determines that the currently measured fusing temperature has reached the predetermined target temperature and before the set preparation waiting time elapses,
    the print pending processor suspends a print job that corresponds to the print request for the double-sided printing, and
    after the set preparation waiting time elapses, the preparation processor cancels the preparation process and the double-sided printing is executed.

4. The image-forming apparatus according to claim 3, wherein
    when the print request checker determines that a print request for single-sided printing was issued in a state in which the print pending processor suspends the print job that corresponds to the print request for the double-sided printing,
    the preparation processor cancels the preparation process and the single-sided printing is executed before the set preparation waiting time elapses, and thereafter, the suspended double-sided printing is resumed for execution.

5. The image-forming apparatus according to claim 1, further comprising:
    a hygrometer that measures a moisture level inside the image-forming apparatus;
    a power supply interruption timer that measures a power supply interruption time that is a period of time in which the image-forming apparatus is turned off; and
    a storage that stores condensation determination condition information including a predetermined temperature determination value, a predetermined moisture determination value, and a predetermined power supply time determination value, wherein
    the predetermined condensation determination information further includes the measured moisture level and the measured power supply interruption time, and
    the condensation determiner determines that the possibility of condensation exists, when the measured apparatus temperature is smaller than the predetermined temperature determination value, the measured moisture level is larger than the predetermined moisture determination value, and the measured power supply interruption time is larger than the predetermined power supply time determination value.

6. The image-forming apparatus according to claim 5, wherein the preparation waiting time setter sets a period of time obtained by adding correction values obtained by converting the measured apparatus temperature, the measured moisture level, and the measured power supply interruption time by respective predetermined correction coefficients to a predetermined extension reference time as the preparation waiting time.

7. The image-forming apparatus according to claim 6, wherein the preparation waiting time set by the preparation waiting time setter is controlled by subtraction in consideration of a use time of the image-forming apparatus to date.

8. The image-forming apparatus according to claim 1, wherein when a predetermined cancel condition for canceling the preparation process is met after the target temperature determiner determines that the currently measured fusing temperature has reached the predetermined target temperature and before the set preparation waiting time elapses, the preparation processor cancels the preparation process even before the set preparation waiting time elapses.

9. The image-forming apparatus according to claim 8, wherein the predetermined cancel condition includes a print request for single-sided printing, a document reading request without involving printing, an open operation of a door attached to the image-forming apparatus, and a request for shifting to a sleep state.

10. The image-forming apparatus according to claim 8, wherein when a predetermined resume condition for resuming the preparation process is met after the preparation process is canceled based on the cancel condition that is met, and when the condensation determiner performs the condensation determination and determines that the possibility of condensation occurring inside the image-forming apparatus exists, the preparation processor resumes the preparation process.

11. An image-forming apparatus having a printing function, comprising:

an apparatus temperature sensor that measures an apparatus temperature inside the image-forming apparatus;

a condensation determiner that determines whether a possibility of condensation occurring inside the image-forming apparatus exists using predetermined condensation determination information including the measured apparatus temperature;

a preparation waiting time setter that sets a preparation waiting time using the predetermined condensation determination information when the condensation determiner determines that the possibility of condensation occurring inside the image-forming apparatus exists;

a preparation processor that performs a preparation process for executing the printing function when the image-forming apparatus is powered; and a fusing temperature sensor that measures a fusing temperature of a fusing device, wherein counting of the preparation waiting time starts when the preparation process begins, and the preparation processor cancels the preparation process after determining that a current fusing temperature measured by the fusing temperature sensor has reached a predetermined target temperature and the counted preparation waiting time has elapsed.

12. An anti-condensation method of an image-forming apparatus having a printing function, the anti-condensation method comprising:

measuring an apparatus temperature inside the image-forming apparatus when the image-forming apparatus is powered;

determining whether a possibility of condensation occurring inside the image-forming apparatus exists using predetermined condensation determination information including the measured apparatus temperature;

setting a preparation waiting time using the predetermined condensation determination information when the possibility of condensation occurring inside the image-forming apparatus exists is determined;

starting a preparation process for executing the printing function;

starting counting of the preparation waiting time when the preparation process starts;

periodically measuring a current fusing temperature of a fusing device during the preparation process;

determining that the currently measured fusing temperature has reached a predetermined target temperature; and canceling the preparation process after determining that the currently measured fusing temperature has reached the predetermined target temperature and when the counted preparation waiting time has elapsed.

* * * * *